(12) United States Patent
Klar et al.

(10) Patent No.: US 8,577,830 B2
(45) Date of Patent: Nov. 5, 2013

(54) METHOD FOR DETECTION OF TUNNEL EXCAVATION BY BRILLOUIN OPTICAL TIME DOMAIN REFLECTOMETRY USING MULTIPLE UNDERGROUND OPTICAL FIBERS

(75) Inventors: Assaf Klar, Haifa (IL); Raphael Linker, Misgav (IL)

(73) Assignee: Technion Research and Development Foundation Ltd., Haifa (IL)

( * ) Notice: Subject to any disclaimer, the term of this patent is extended or adjusted under 35 U.S.C. 154(b) by 275 days.

(21) Appl. No.: 12/953,463

(22) Filed: Nov. 24, 2010

(65) Prior Publication Data

US 2012/0130930 A1 May 24, 2012

(51) Int. Cl.
*G06F 15/00* (2006.01)
(52) U.S. Cl.
USPC .............................................. 706/62
(58) Field of Classification Search
USPC .............................. 706/12, 15, 45
See application file for complete search history.

(56) References Cited

U.S. PATENT DOCUMENTS 7,480,460 B2 * 1/2009 Colpitts et al. ............. 398/108

OTHER PUBLICATIONS

Klar et al., Feasibility study of the automated detection and localization of underground tunnel excavation using Brillouin optical time domain reflectometer, Apr. 13, 2009, SPIE Digital Library, pp. 1-12.*
Bao et al., Tensile and Comressive Strain Measurement in the Lab and Field With Distributed Brillouin Scattering Sensor, 2008, Journal of Lightwave Technology, vol. 19, No. 11, pp. 1-7.*
Szustakowski, et al., Fiber optic sensors for perimeter security with intruder localization, 2005, SPIE vol. 5954, pp. 1-15.*
Udd et al., SPIE vol. 7316 p. 1, Apr. 13, 2009, SPIE, p. 1.*

* cited by examiner

*Primary Examiner* — David Vincent
(74) *Attorney, Agent, or Firm* — Oren Reches

(57) ABSTRACT

A non transitory computer readable medium and a method of detecting excavation of an underground tunnel, the method includes: propagating a light pulse through an underground optic fiber; generating detection signals responsive to Brillion scattered light resulting from the propagating of the light pulse through the underground optic fiber; wherein the detection signals represent tension values at multiple locations along the underground optic fiber; and processing the detection signals to detect excavation of the underground tunnel.

23 Claims, 16 Drawing Sheets

400

| |
|---|
| Averaging different sets of detections signals. 431 |
| Applying a wavelet transformation on the sets of detection signals to provide sets of wavelet coefficients. 432 |
| Calculating a variance of each group of wavelet coefficient; wherein a group of wavelet coefficients comprises wavelet coefficients that belong to different sets of wavelet coefficients but share a same location in each set of wavelet coefficients. 433 |
| Selecting selected groups of wavelet coefficients having largest variance values, and determining an excavation of the underground tunnel based on the selected groups of wavelet coefficients. 434 |
| selecting selected groups of wavelet coefficients having largest variance values; providing the selected wavelet coefficients to a neural network trained to predict an impact of the underground tunnel on the underground optic fiber; and determining an excavation of the underground tunnel based on the selected groups of wavelet coefficients and on the impact of the underground tunnel on the underground optic fiber. 435 |
| Applying a wavelet transformation on the sets of detection signals to provide sets of wavelet coefficients, providing at least a portion of the sets of wavelet coefficients to a neural network trained to predict an impact of the underground tunnel on the underground optic fiber; and determining an excavation of the underground tunnel, by the neural network. 436 |
| predicting the impact of the underground tunnel on the underground optic fiber by calculating a ratio $V*D*D/z$; wherein V is a volume loss rate of ground resulting from the excavation of the underground tunnel, D is a diameter of the underground tunnel and z is a distance between the underground tunnel and the underground optic fiber. 437 |
| Determining that an underground tunnel exists if the ratio $V*D*D/z$ is above a threshold value of 0.00015. 438 |
| Determining that an underground tunnel exists if the ratio $V*D*D/z$ is above a threshold value of 0.00005. 439 |
| Predicting the impact of the underground tunnel on the underground optic fiber by a neural network while applying multiple models that differ from each other each model models the impact of the underground tunnel on the underground optic fiber. 441

Ignoring an event that alters a tension of underground optic fiber over a distance that is shorter than a predefined threshold. 442 |

FIG. 5  430

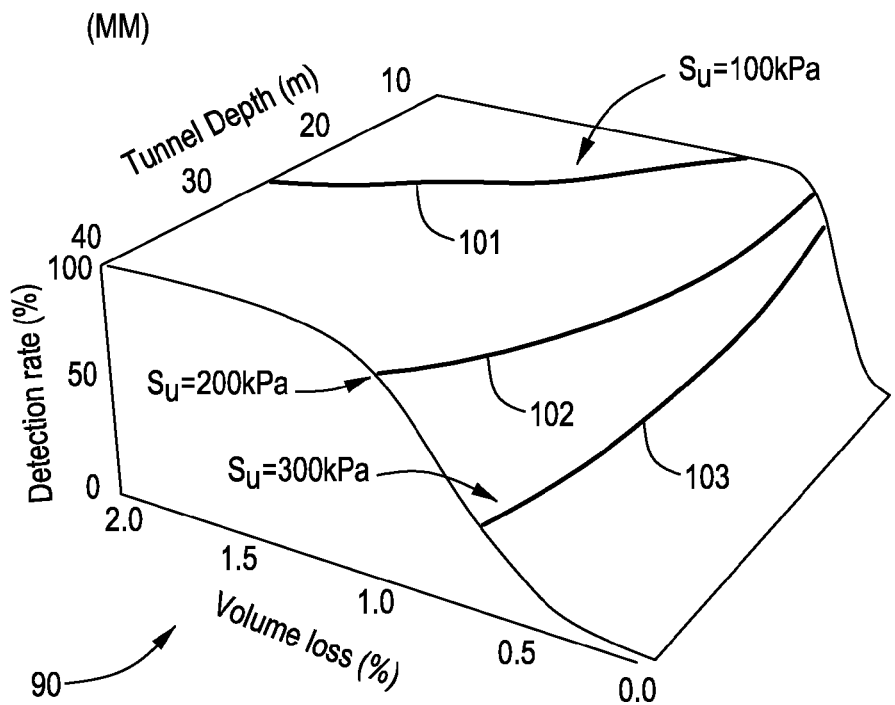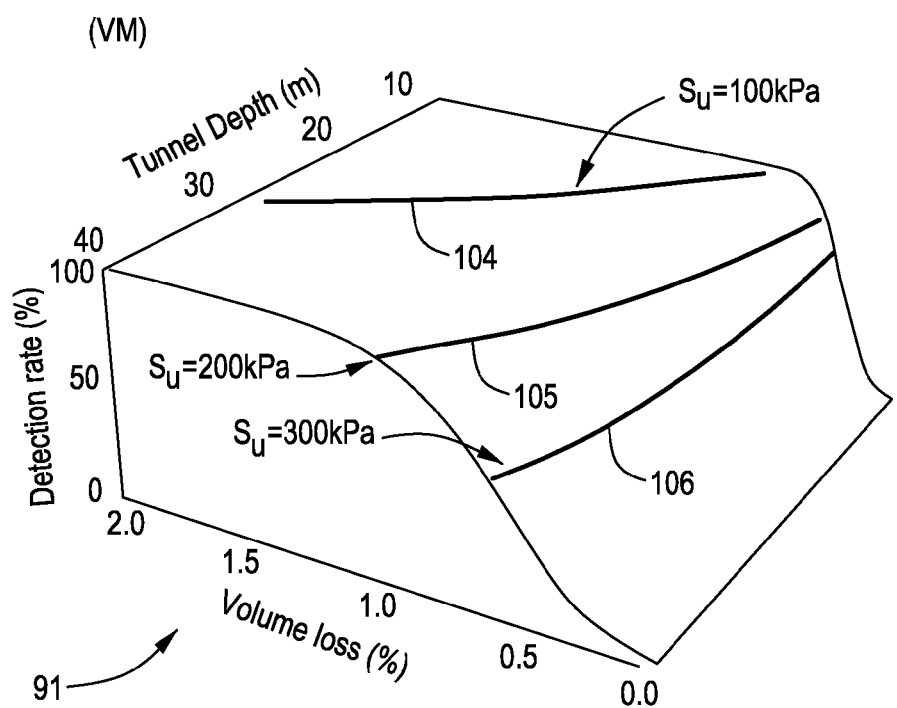
FIG. 17

METHOD FOR DETECTION OF TUNNEL EXCAVATION BY BRILLOUIN OPTICAL TIME DOMAIN REFLECTOMETRY USING MULTIPLE UNDERGROUND OPTICAL FIBERS

RELATED APPLICATIONS

This application claims priority from U.S. provisional patent filing date 22 Nov. 2009, Ser. No. 61/263,380 which is incorporated herein by reference.

BACKGROUND OF THE INVENTION

Cross-borders smuggling tunnels enable unmonitored movement of people, drugs and weapons and pose a very serious threat to homeland security. Recent advances in strain measurements using optical fibers allow the development of smart underground security fences that could detect the excavation of smuggling tunnels.

Cross-borders smuggling tunnels enable unmonitored movement of people, drugs and weapons and pose a very serious threat to homeland security. Depending on geo-political factors and intended tunnel use, these tunnels range from highly sophisticated infrastructures (for instance at the Mexico-US border, where tunnels are deep and wide and are equipped with communications devices and rail tracks) to shallow hand-dug crawling spaces.

An overview of the prior art can be found in the following articles:

[1] Alsberg, B. K., Woodward, A. M., Winson, M. K., Rowland, J. J., Kell, D. B., 1998. Variable selection in wavelet regression models. Analytica Chimica Acta 368, 29-44.

[2] Yokogawa, 2010. B-OTDR AQ8603: Optical Strain Analyser, http://www.ymtllogin.co.uk/datasheets/aq8603.pdf

[3] Attewell, P. B., Yeates, J., Selby, A. R., 1986. Soil movements induced by tunnelling and their effects on pipelines and structures. Blackie and Son Ltd, London.

[4] Bell, T. H., Barrow, B. J., Miller, J. T., 2001. Subsurface discrimination using electromagnetic induction sensor. IEEE transactions on geoscience and remote sensing 39, 1286-1293

[5] Chandler, R. J., 1988. The in-situ measurements of the undrained shear strength of clays using the field vane. Vane shear strength testing in soils: field and laboratory studies, ASTM STP 1014, A. F. Rochards, Ed., ASTM, Philadelphia, pp. 13-44.

[6] Collar, F., Fenning, P., Mora, C., 2005. Application of drillgole vector magnetic measurements to resolve the position of existing underground structures. NDT&E International 38, 231-236

[7] Debnath, L., 2002. Wavelet transforms and their applications. Birkahuser Publ. Boston.

[8] Depczynski, U., Jetter, K., Molt, K., Niemoller, A., 1999. Quantitative analysis of near infrared spectra by wavelet coefficient regression using a genetic algorithm. Chemometrics and Intelligent Laboratory Systems 47, 179-187.

[9] Ehrentreich, F., 2002. Wavelet transform applications in analytical chemistry. Analytical and Bioanalytical chemistry 372, 115-121.

[10] Ellis, G. A., Peden, I. C., 1997. Cross-borehole sensing: Identification and localization of underground tunnels in the presence of a horizontal stratification. IEEE transactions on geoscience and remote sensing 35, 756-761

[11] Galindez, C. A., Thevenaz, L., 2008. Effect of pulse chirp on distributed Brillouin fiber sensing. 19th International Conference on Optical Fibre Sensors, vol. 7004, p. 70044J-4 SPIE, 2008.

[12] Haykin, S., 1999. Neural networks. A Comprehensive Foundation. Prentice Hall, N.J.

[13] Horiguchi, T., Kurashima, T., Tateda M., 1990. A technique to measure distributed strain in optical fibers. IEEE photonics technology letters 2, 352-354.

[14] Klar, A., Osman, A. S., Bolton, M., 2007. 2D and 3D upper bound solutions for tunnel excavation using 'elastic' flow fields. International journal for numerical and analytical methods in geomechanics, 31, 1367-1374. DOI: 10.1002/nag.597

[15] Klar, A., Bennett, P. J., Soga, K., Mair, R. J., Tester, P., Fernie, R., St John, H. D., Torp-Peterson, G., 2006. Distributed strain measurement for pile foundations. Proceedings of the Institution of Civil Engineers-Geotechnical Engineering, 159, 135-144.

[16] Leung, A. K., Chau, F. T., Gao, J. B., Shih, T. M., 1998. Application of wavelet transform in infrared spectrometry: spectral compression and library search. Chemometrics and Intelligent Laboratory Systems 43, 69-88.

[17] Macklin, S. R. 1999 The prediction of volume loss due to tunnelling in overconsolidated clay based on heading geometry and stability number. Ground Engineering, 32(4), 30-33.

[18] Mair, R. J., and Taylor, R. N. (1997). "Bored tunnelling in the urban environment" 14th international conference on soil mechanics and foundation engineering. City: Balkema: Hamburg, pp. 2353-2385.

[19] Mair, R. J., Taylor, R. N., Bracegirdle, A., 1993. Subsurface settlement profiles above tunnels in clays. Geotechnique 43, 315-320.

[20] Marshall, A. M., Mair, R. J., 2008. Centrifuge modelling to investigate soil-structure interaction mechanisms resulting from tunnel construction beneath buried pipelines. Proceedings of the 6th international symposium IS. Shanghai, 10-12 Apr. 2008

[21] Mindlin R. D., 1936. Forces at a Point in the Interior of a Semi-infinite Solid. Physics 7, 195.

[22] Mohamad, H. Bennett, P. J. Soga, K., Klar, A., Pellow, A., 2007. Distributed optical fiber strain sensing in a secant piled wall. ASCE Geotechnical Special Publication 175, pp. 81.

[23] Nikles, M., Thevenaz, L., Robert, P. A. 1997. Brillouin gain spectrum characterization in single mode optical fibers. Journal of light wave technology 15, 1842-1851.

[24] Norville, P. D., Scott, W. R., 2003. Passive detection of buried structures using elastic waves. Proceedings of SPIE—The International Society for Optical Engineering 5090, pp. 142-154

[25] Ohno, H., Naruse, H., Kihara, M., Shimada, A., 2001. Industrial applications of the BOTDR optical fiber strain sensor. Optical fiber technology 7, 45-64

[26] Omnisens, 2005. DiTeSt-STA200 Series: optic fiber distributed sensing system. http://www.omnisens.ch/products/products_dis_ditest_sta200.htm (19/08/05)

[27] Schneider, J., Peden, I. C., 1993. Detection of tunnels in low loss media illuminated by a transient pulse. IEEE transactions on geoscience and remote sensing 31, 503-506

[28] Smith, J., Brown, A., DeMerchant, M. Bao, X., 1999. Simultaneous distributed strain and temperature measurement. Applied optics 38, 5372-5377.

[29] Trygg, J., Wold, S., 1998. PLS regression on wavelet compressed NIR spectra. Chemometrics and Intelligent Laboratory Systems 42, 209-220.
[30] Verruijt, A., Booker, J. R., 1996. Surface settlement due to deformation of a tunnel in an elastic half plane. Geotechnique 46, 753-756.
[31] Vorster, T. E. B., Soga, K., Mair, R. J., Bennett, P. J., Klar, A., Choy, C. K., 2006. The use of optic fiber sensors to monitor pipeline response to tunnelling. GeoCongress 2006: Geotechnical Engineering in the Information Technology Age, pp. 33
[32] Walczak, B., Massart, D. L., 1997. Noise suppression and signal compression using the wavelet packet transform. Chemometrics and Intelligent Laboratory Systems 36, 81-94.
[33] Zeng, X., Bao, X., Chhoa, C. Y., Bremner, T. W., Brown, A. W., DeMerchant, M. D., Ferrier, G., Kalamkarov, A. L., Georgiades, A. V., 2002. Strain measurement in a concrete beam by use of the Brillouin-scattering-based distributed fiber sensor with single-mode fibers embedded in glass fiber reinforced polymer rods and bonded to steel reinforcing bars. Applied optics 41, 5105-5114
[34] Zou, L., Bao, X., Fabien, R., Chen, L. 2006. Distributed Brillouin fiber sensor for detecting pipeline buckling in an energy pipe under internal pressure. Applied optics 45, 3372-3377.

Some of these mentioned above articles are referred to in the specification. For simplicity of explanation an article will be referred using its serial number ([xx]) or the names of its authors and the year of publication (for example—reference [33] can be referred to as Zeng et al., 2002).

Small hand-dug tunnels are routinely excavated along the borders of Israel and the Palestinian-authority and are considered extremely problematic; it is believed by many that the abduction of a Israeli solider by such a tunnel was a key event which led up to the conflicts in Gaza and Lebanon in the summer of 2006.

Various approaches for tunnel detection have been investigated worldwide. Electromagnetic induction sensors can be used to detect tunnels that contain steel (reinforcement rod or rail tracks) ([4], [5]). Listening devices can be used to detect acoustic (mechanical) waves that originate from inside the tunnels ([24]). Finally, the propagation of radar-type waves between two parallel boreholes (transmitting and receiving antennas) can be used to detect tunnels ([27], [10]). Although this method has yielded the most promising results, it requires the constant presence of personnel to move the antennas from one borehole to another.

Even though the results of some of these methods are satisfying for large tunnels, detection of small (<1 m diameter) tunnels remains a major challenge.

SUMMARY OF THE INVENTION

A method of detecting excavation of an underground tunnel, the method comprising: propagating a light pulse through an underground optic fiber; generating detection signals responsive to Brillion scattered light resulting from the propagating of the light pulse through the underground optic fiber; wherein the detection signals represent tension values at multiple locations along the underground optic fiber; and processing the detection signals to detect the excavation of the underground tunnel.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

FIG. 5 illustrates a stage of processing detection signals according to an embodiment of the invention;

FIGS. 13-20 illustrate statistical information relating to a performance of neural networks trained to detect the excavation of underground tunnels, according to various embodiments of the invention.

DETAILED DESCRIPTION OF THE DRAWINGS

Figure 1:
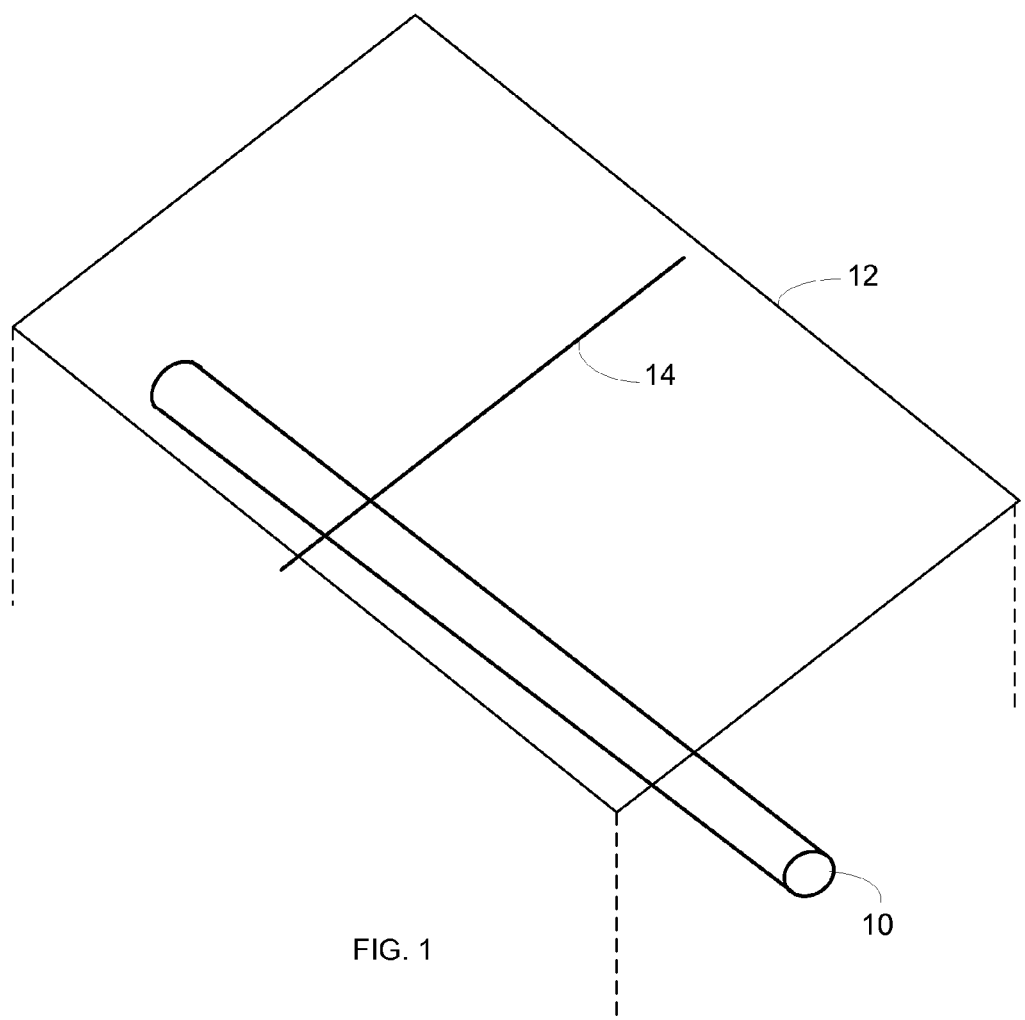
FIG. 1 illustrates an underground optic fiber and its environment according to an embodiment of the invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Underground excavation in soil (unlike in rock) causes substantial deformations and strains in the medium, which are not limited to the immediate vicinity of the excavation. A sensing device, sufficiently sensitive, could detect these strains and hence the excavation process, at least in principle.

Fiber-based Brillouin optical time-domain reflectometry (BOTDR) is the natural candidate for performing such a measurement. The ability of BOTDR sensors to provide distributed measurements of temperature and strain over tens of kilometers has been demonstrated in several studies ([13]). Although the sensitivity and/or spatial resolution of the early systems were rather limited, systems with sensitivity of less than 5 με and spatial resolution of 1 m are currently commercially available. This improvement of performance has led to the use of BOTDR devices in a number of applications that require distributed strain measurements (e.g. Zeng et al., 2002; Zou et al., 2006). In particular, BOTDR devices are being used in geotechnical engineering to monitor the effect of excavations on pipelines and foundation piles (Vorster et al. 2005; Klar et al., 2006, Mohamad et al. 2007). Although these studies deal with the effects of excavations of larger tunnels, for underground transportation and water systems, they clearly demonstrate the ability of the fiber-based BOTDR sensors to detect soil strains.

The suggested method uses fiber-based BOTDR to detect the excavation of small (diameter<1 m) tunnels in clayey soils.

FIG. 1 illustrates an underground optic fiber 14 and its environment according to an embodiment of the invention. The underground optic fiber 14 is buried in shallow depth below the surface of the ground 12. It can be parallel or substantially parallel to the surface of the ground. FIG. 1 also illustrates an underground tunnel 10 that is buried underneath the underground optic fiber 14. The underground tunnel 10 is illustrates as being substantially parallel to the surface of the ground but perpendicular to the underground optic fiber 14. It is noted that other spatial relationships may exist between the underground optic fiber 14, the underground tunnel 10 and the surface of the ground 12.

Figure 2:
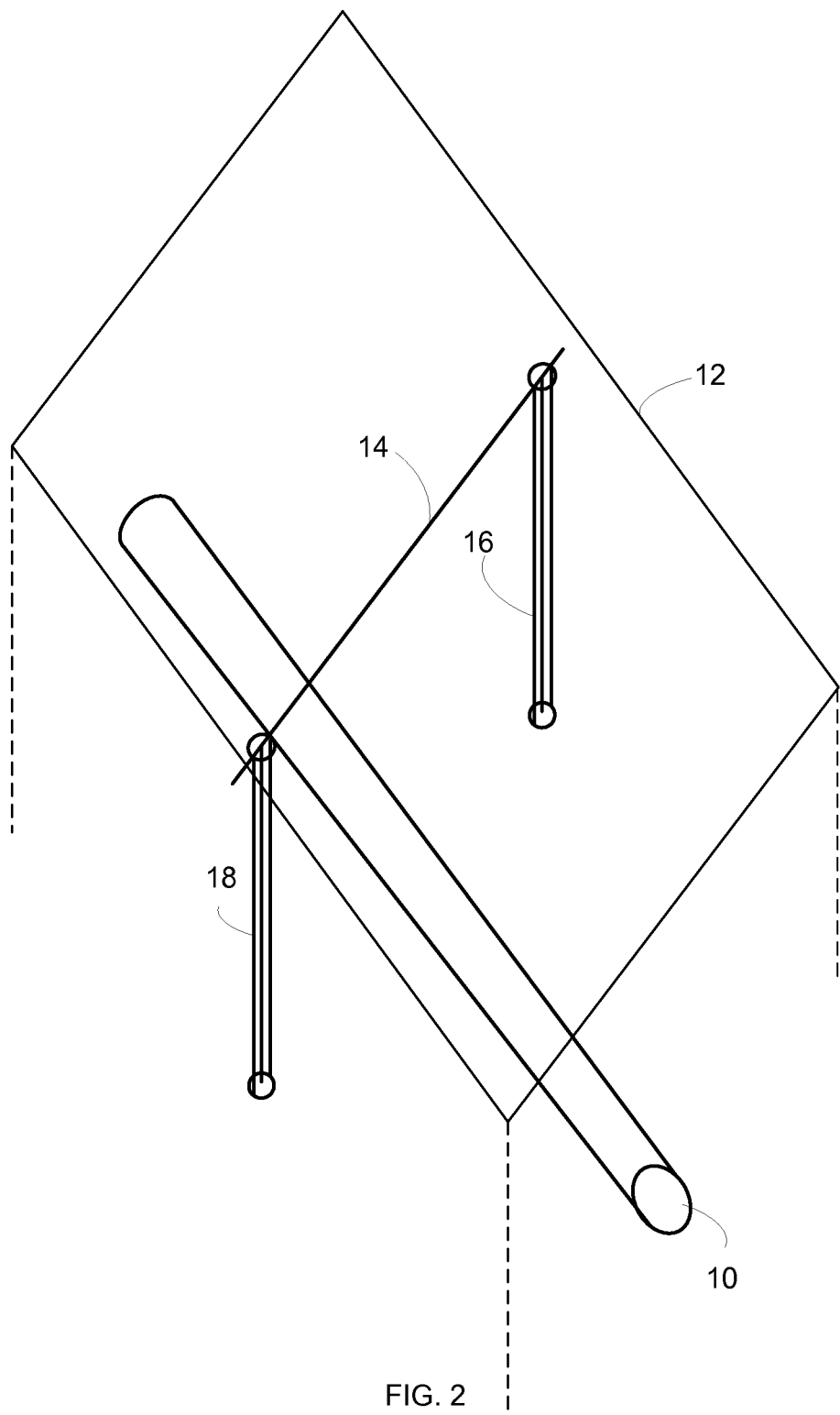
FIG. 2 illustrates an underground optic fibers and its environment according to another embodiment of the invention.

FIG. 2 illustrates an underground optic fiber 14 and its environment according to an embodiment of the invention. The underground optic fiber 14 stretches between mini-piles 16 and 18 and also enters and exits each mini-pile. Each mini-pile can be vertical to the surface of the ground 12 but this is not necessarily so. The underground optic fiber 14 can stretch between the mini-piles while being below the surface of the ground but this is not necessarily so. It can be parallel or substantially parallel to the surface of the ground. FIG. 2 also illustrates an underground tunnel 10 that is buried underneath the surface of the ground 12. The underground tunnel 10 can be positioned below the lower ends of the mini-piles but this is not necessarily so. The underground tunnel 10 is illustrates as being substantially parallel to the surface of the ground but perpendicular to the mini-piles 16 and 18. It is noted that other spatial relationships may exist between the underground optic fiber 14, the mini-piles 16 and 18, the underground tunnel 10 and the surface of the ground 12. It is noted that the underground fiber optic 14 has at least a portion (especially a portion that affects the signal analysis) that is underground.

In both embodiments (illustrated in FIGS. 1 and 2), strains would develop in the optic fiber 14 due to the soil displacements induced by the underground tunnel excavation.

The configuration of FIG. 2 may be better suited for detection of very deep underground tunnels. While in the first option (the configuration of FIG. 1) the interaction between the soil and the fiber is direct, in the second option (the configuration of FIG. 2) the interaction may be through the mini-piles. The solutions presented in the present work include those interaction effects.

It has been found that these two configurations are effective in terms of false alarms and localization of small deep tunnels. The effectiveness has been evaluated by a combined analytical-experimental approach, in which analytical solutions of tunnel excavations are combined with experimental measurements of surface activities to create simulated signals. These simulated signals are used to calibrate and validate a system that detects, and to some extent localizes, tunneling activities automatically.

Figure 3:
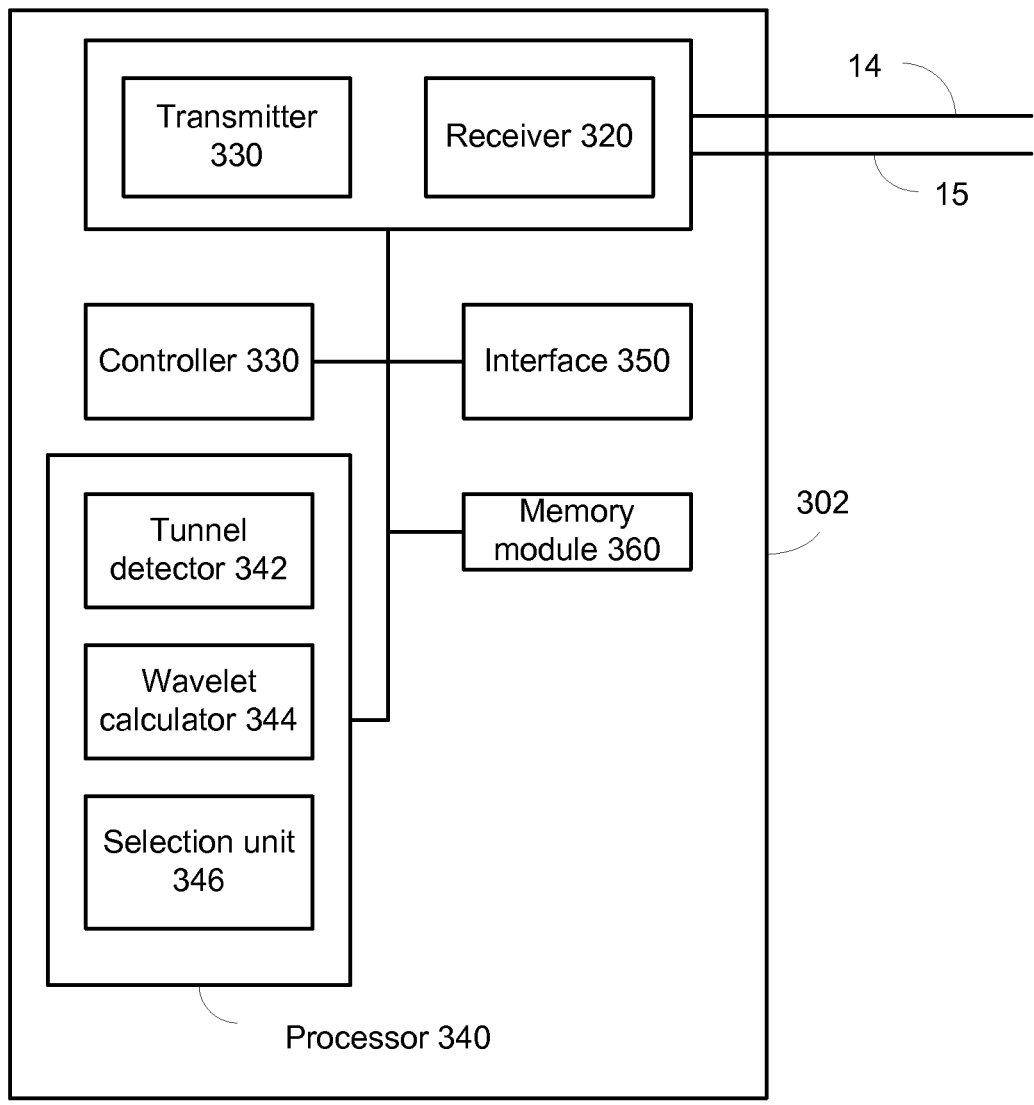
FIG. 3 illustrates a relationship between a tension of a segment of an underground optic fiber and detection signals generates in response to this tension.

FIG. 3 illustrates a system 300 according to an embodiment of the invention.

System 300 includes measurement module 302 that is connected to an underground optic fiber 14.

The measurement module 302 includes a transmitter 310, a receiver 320, a controller 330, a processor 340, interface 350 and memory module 360. FIG. 3 illustrates processor 340 as including a tunnel detector 342, a wavelet calculator 344, and a selection unit 346. The tunnel detector 342 can be a neural network.

The interface 350 may include at least one of the following: a display, a keyboard, a contact screen, a wireless transmitter, a wireless receiver, a wired transmitter, a wired receiver and the like.

The controller 330 controls the transmitter 310 and the receiver 320 and can especially control the timing of a transmission of a light pulse and an activation of the receiver 320. The controller 320 and the processor 340 can be separate entities but can be integrated together.

Processor 340 can execute instructions (code, software) that are stored in the memory module 360. These instructions can be retrieved from a non-transitory computer readable medium such as disk, diskette, tape, and the like. The memory module 360 itself is a non-transitory computer readable medium.

FIG. 3 further illustrates the measurement module 302 as being connected to another underground optic fiber 15. This other underground optic fiber 15 is unstrained and can assist in a temperature compensation process. It is assumed that tension values of the other underground optic fiber 15 are attributed to temperatures at different locations of the other underground optic fiber 15. The other underground optic fiber 15 is places near the underground optic fiber 14 and it is assumed that both underground optic fibers are subjected to the same temperatures. Because the strain values along the underground optic fiber 14 are responsive to tension and temperature, the detection signals obtained by receiver 320 from the other underground optic fiber 15 can be used to compensate for temperature changes along the underground optic fiber 14.

When using multiple optic fibers time division multiplexing (ot frequency division multiplexing) can be applied and pulses of light can be sent on one underground optic fibers in a manner that does not interfere with the transmission and reception of signals over the other underground optic fiber.

The transmitter 310 transmits a light pulse to the underground optic fiber 14. This light pulse propagates through the underground optic fiber 14 and backscattered light reaches the receiver 320. The same applied to the other underground optic fiber 15. For simplicity of explanation the following description relates to the underground optic fiber 14.

The receiver 320 generates detection signals responsive to Brillion scattered light resulting from the propagating of the light pulse through the underground optic fiber. The detection signals represent tension values at multiple locations along the underground optic fiber 14. The time of arrival of a detection signal represents a location along the underground optic fiber 14 and the frequency of the detection signal represents a tension of the underground optic fiber 14 at this location. The locations can be spaced apart from each other by few centimeters to few meters (and even mode). A non-limiting example includes locations that are spaced apart by 10 centimeters from each other.

The processor 340 processes the detection signals to detect the excavation of the underground tunnel.

The transmitter 310 may transmit another light pulse through the unstrained underground optic fiber 15. The receiver can generate other detection signals responsive to Brillion scattered light resulting from the propagating of the other light pulse through the unstrained underground optic fiber. The other detection signals represent tension values at multiple locations along the other underground optic fiber. The processor 340 can process the other detection signals and the detection signals to provide a temperature compensated estimation of a presence of the underground tunnel.

The transmitter 310 can transmit multiple light pulses, one after the other, the receiver 320 can provide detection signals, and the processor can process the detection signals resulting from the propagation of the multiple light pulses through the underground optic fiber 14 to detect an underground tunnel.

The detection signals obtained from a propagation of a single light pulse may form a set detection signals.

The processor 340 may be arranged to average different sets of detections signals. The averaging improved the signal to noise ration by averaging random noises that tend to cancel each other.

According to an embodiment of the invention, the processor 340 can ignore some detection signals and be responsive to other (selected) detection signals. The selection of signals can be performed by the selection unit 346 of the processor 340 and can be aimed to select the detection signals that embed meaningful information.

According to an embodiment of the invention the wavelet calculator 344 can apply a wavelet transformation on the sets of detection signals to provide sets of wavelet coefficients.

Figure 7:
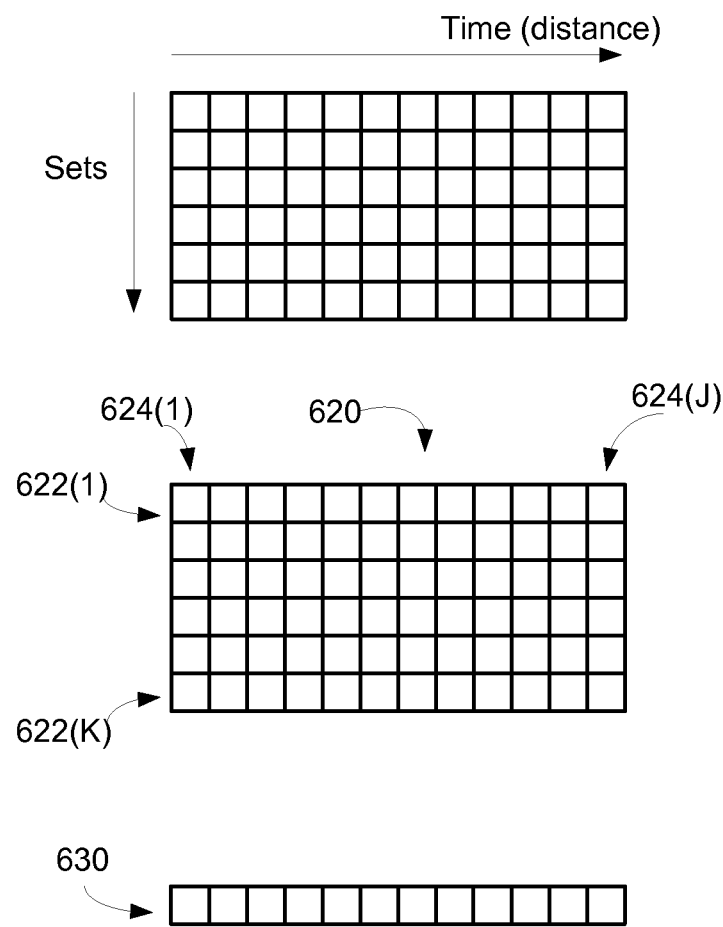
FIG. 7 illustrates sets of detection signals, sets of wavelet coefficients and selected sets of wavelet coefficients according to an embodiment of the invention.

The wavelet calculator 344 or another entity of processor 340 can also calculate a variance of each group of wavelet coefficient; wherein a group of wavelet coefficients includes wavelet coefficients that belong to different sets of wavelet coefficients but share a same location in each set of wavelet coefficients. Referring to the example set fourth in FIG. 7, multiple sets of wavelet coefficients populate rows 632(1)-632(k) of a wavelet coefficient matrix 620. The wavelet coefficient matrix 620 includes multiple columns 634(1)-634(j) and each of these columns forms a group of wavelet coefficients. The inventors generated a wavelet coefficient matrix 620 that has 250 columns and 1000 rows, each row includes 250 wavelet coefficients obtained by applying a wavelet transform on 250 samples representing 250 locations that are spaced apart by 10 centimeters.

Referring back to FIG. 3, the selection unit 346 can select selected groups of wavelet coefficients having largest variance values. These selected groups of wavelet coefficients can be provided to the tunnel detector 342 that may be arranged to determine an excavation of the underground tunnel based on the selected groups of wavelet coefficients.

The tunnel detector 342 can be a neural network that is trained to predict an impact of the underground tunnel on the underground optic fiber. The neural network can receive all wavelet coefficients or portions thereof and process these wavelet coefficients to detect a tunnel based on the selected groups of wavelet coefficients and on the impact of the underground tunnel on the underground optic fiber.

According to an embodiment of the invention the neural network is trained using multiple sets of wavelet coefficients (or portions of these sets), each set associated with values of: V—a volume loss rate of ground resulting from the excavation of the underground tunnel, D—a diameter of the underground tunnel, and z—a distance between the underground tunnel and the underground optic fiber.

Some sets of wavelet coefficients used to train the neural network can be calculated by simulation. Additionally or alternatively, some sets of wavelet coefficients can be obtained by actual measurements. It is noted that the underground optic fiber can include multiple segments and that at least some of the wavelet coefficient sets can relate to different segments of the underground optic fiber.

The neural network or any other type of tunnel detector can predict the impact of the underground tunnel on the underground optic fiber by calculating a ratio V*D*D/z.

Conveniently, the tunnel detector 342 can determine that an underground tunnel exists if the ratio V*D*D/z is above a threshold value of 0.00015. Alternatively, the tunnel detector 342 can determine that an underground tunnel exists if the ratio V*D*D/z is above a threshold value of 0.00005.

The tunnel detector 342 can estimate the impact of the underground tunnel on the underground optic fiber while applying multiple models that differ from each other, each model models the impact of the underground tunnel on the underground optic fiber.

The tunnel detector 342 can ignore an event that alters a tension of underground optic fiber over a distance that is shorter than a predefined threshold. It was found that underground tunnels impact portions of the underground optic fiber that are longer than portions affected by above surface activities. The latter typically affected portions that were shorter than few meters while tunnels affected portions that exceeded about ten or twenty meters.

Figure 4:
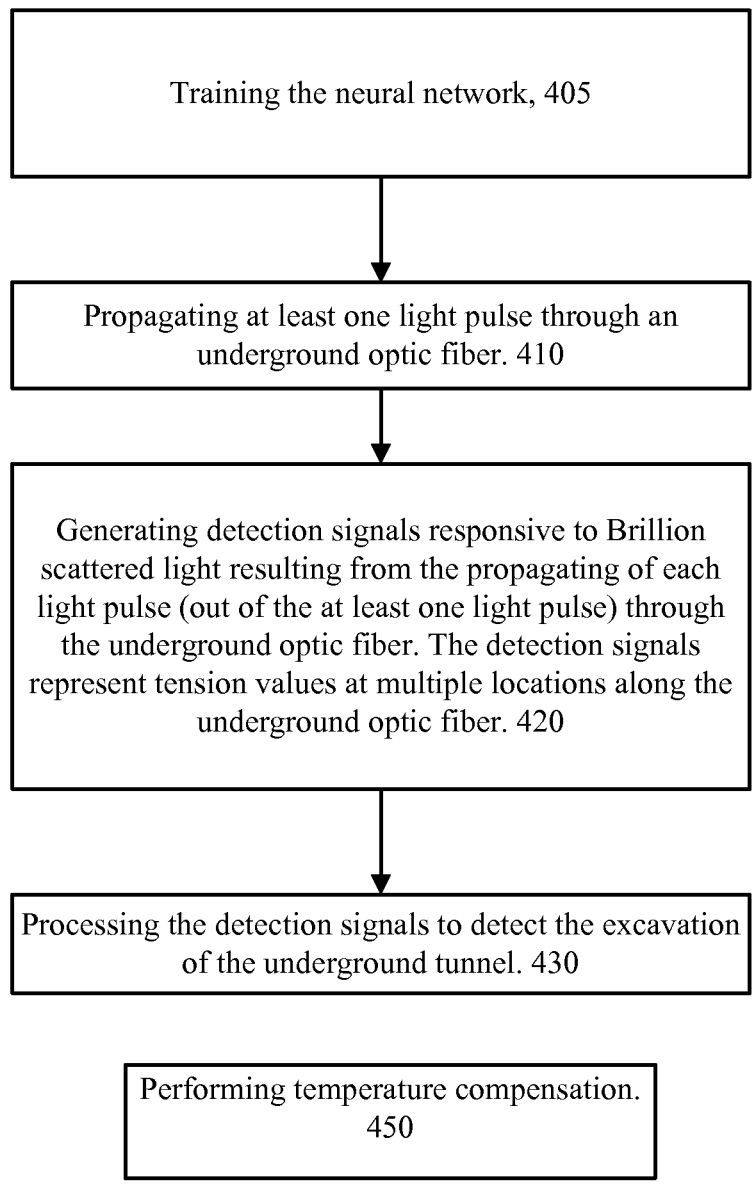
FIG. 4 illustrates a system according to an embodiment of the invention.

FIG. 4 illustrates method 400 of detecting excavation of an underground tunnel, according to an embodiment of the invention.

Method 400 may include stages 410, 420 and 430.

Stage 410 includes propagating at least one light pulse through an underground optic fiber.

Stage 410 may include at least one of the following: (i) propagating the light pulse through an underground optic fiber that comprises a substantial portion that is substantially parallel to an upper surface of the ground, (ii) propagating light pulses through multiple underground optic fibers; (iii) propagating the light pulse through multiple underground optic fiber segments of the underground optic fiber that are located in substantially vertical rigid piles.

The propagating is followed by stage 420 of generating detection signals responsive to Brillion scattered light resulting from the propagating of each light pulse (out of the at least one light pulse) through the underground optic fiber. The detection signals represent tension values at multiple locations along the underground optic fiber. Detection signals generated as a result of a propagation of a single light pulse are referred to as a set of detection signals. Accordingly, when multiple light pulses are propagated through the underground optic fiber multiple sets of detection signals are generated.

The detection signals are processed during stage 430 of processing the detection signals to detect the excavation of the underground tunnel.

The processing (430) may include at least one of the following, as illustrated by FIG. 5: (i) averaging different sets of detections signals (431); (ii) applying a wavelet transformation on the sets of detection signals to provide sets of wavelet coefficients (432); (iii) calculating a variance of each group of wavelet coefficient; wherein a group of wavelet coefficients comprises wavelet coefficients that belong to different sets of wavelet coefficients but share a same location in each set of wavelet coefficients (433); (iv) selecting selected groups of wavelet coefficients having largest variance values, and determining an excavation of the underground tunnel based on the selected groups of wavelet coefficients (434); (v) selecting selected groups of wavelet coefficients having largest variance values; providing the selected wavelet coefficients to a neural network trained to predict an impact of the underground tunnel on the underground optic fiber; and determining an excavation of the underground tunnel based on the selected groups of wavelet coefficients and on the impact of the underground tunnel on the underground optic fiber (435); (vi) applying a wavelet transformation on the sets of detection signals to provide sets of wavelet coefficients, providing at least a portion of the sets of wavelet coefficients to a neural network trained to predict an impact of the underground tunnel on the underground optic fiber; and determining an excavation of the underground tunnel, by the neural network (436); (vii) predicting the impact of the underground tunnel on the underground optic fiber by calculating a ratio V*D*D/z; wherein V is a volume loss rate of ground resulting from the excavation of the underground tunnel, D is a diameter of the underground tunnel and z is a distance between the underground tunnel and the underground optic fiber (437); (viii) determining that an underground tunnel exists if the ratio V*D*D/z is above a threshold value of 0.00015 (438); (ix) determining that an underground tunnel exists if the ratio V*D*D/z is above a threshold value of 0.00005 (439); (x) predicting the impact of the underground tunnel on the underground optic fiber by a neural network while applying multiple models that differ from each other each model models the impact of the underground tunnel on the underground optic fiber (441), and (xi) ignoring an event that alters a tension of underground optic fiber over a distance that is shorter than a predefined threshold (442).

Referring back to FIG. 4, according to various embodiments of the invention method 400 also includes at least one of the following stages: (i) stage 405 of training the neural network, and (ii) stage 460 of performing temperature compensation.

Stage 405 may include at least one of the following: (i) training the neural network with sets of wavelet coefficients, each set of wavelet coefficient is associated with a V value, a D value and a z value, (ii) training the neural network with sets of wavelet coefficients; wherein at least one set of wavelet coefficients is generated by simulation, (xi) training the neural network with sets of wavelet coefficients; wherein at least two sets of wavelet coefficients differ from each other by a segment of underground optic fiber associated with the sets of wavelet coefficients.

Stage 460 may include propagating one or more other light pulse through an unstrained underground optic fiber that is subjected to substantially the same temperatures as the underground optic fiber; generating other detection signals responsive to Brillion scattered light resulting from the propagating of the other light pulse through the unstrained underground optic fiber; wherein the other detection signals represent tension values at multiple locations along the other underground optic fiber; and processing the other detection signals and the detection signals to provide a temperature compensated estimation of a presence of the underground tunnel.

Figure 6:
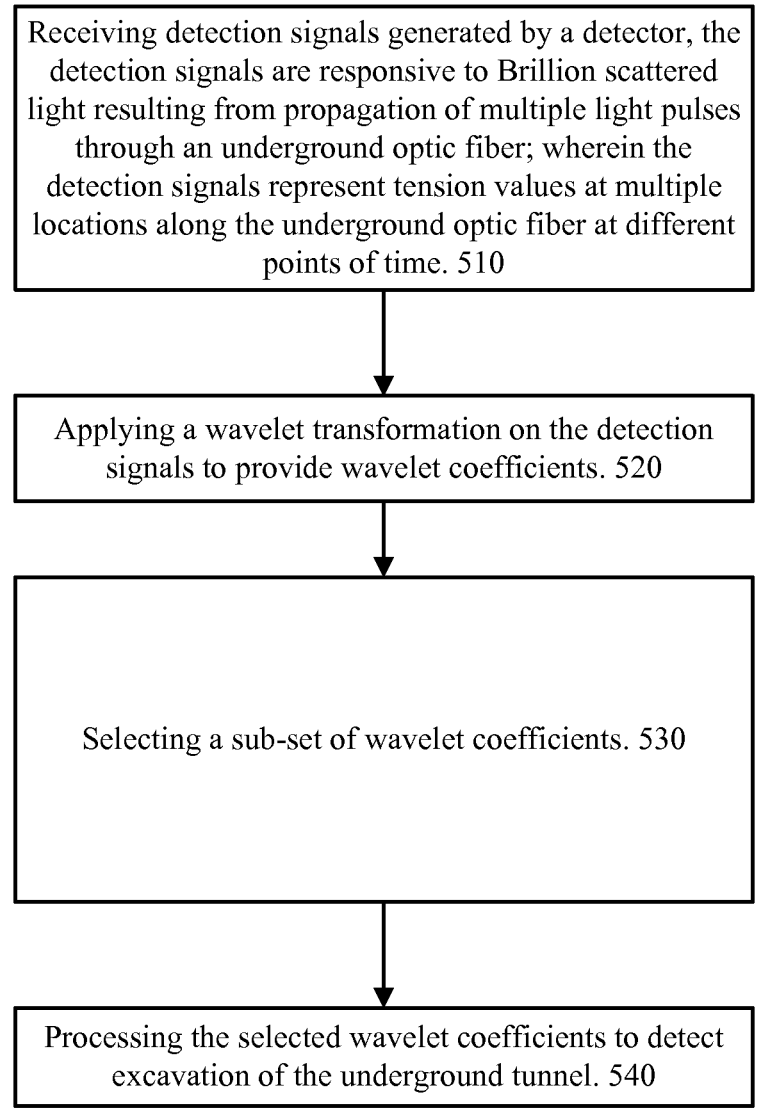
FIG. 6 illustrates a method according to an embodiment of the invention.

FIG. 6 illustrates method 500 according to an embodiment of the invention. Method 500 includes stage 510 of receiving detection signals generated by a detector, the detection signals are responsive to Brillion scattered light resulting from propagation of multiple light pulses through an underground optic fiber; wherein the detection signals represent tension values at multiple locations along the underground optic fiber at different points of time.

Stage 510 is followed by stage 520 of applying a wavelet transformation on the detection signals to provide wavelet coefficients. Stage 520 is followed by stage 530 of selecting a sub-set of wavelet coefficients. Stage 530 is followed by stage 540 of processing the selected wavelet coefficients to detect excavation of the underground tunnel.

Theory, Experimental and Simulated Results

Brillouin scattering results from the interaction of light photons with acoustic waves (phonons). When a pulse of light is transmitted by a transmitter and travels along the optical fiber, a small fraction of the light is backscattered toward the transmitter. In the case of Brillouin scattering, the frequency of the backscattered light is shifted by an amount proportional to the acoustic velocity at the scattering location (Nikles et al. 1997):

$$v_B = \frac{2nV_a}{\lambda} \tag{1}$$

where $V_B$ is the Brillouin shift, $V_a$ is the acoustic velocity within the fiber, n is the refractive index of the fiber, and $\lambda$ is the wavelength of the incident light wave.

Temperature changes and fiber elongation (straining) change the acoustic velocity within the fiber. By resolving the back scattered signal in time and frequency, a complete strain profile along the full length of the fiber can be obtained.

The traveling pulse of light is scattered back from every point along the fiber. Using the velocity of light in the fiber, this time domain information is converted into location (distance along the fiber).

By resolving the frequency content of the back scattered light, a 3D graph can be obtained. The shift of the peaks correspond to the changes Brillouin shift, and hence can be translated back to strain or temperature reading. Note that the power of the backscattered light may decrease both due to straining and distance from the fiber. However, since the shift in frequency is of interest (and not the power) this does not affect the results, and the analysis can be conducted over a significant length of fiber, up to 30 km. This ability to monitor tens of kilometers, together with the fact that cheap conventional optical fibers may be used as the sensors, makes this technology a perfect candidate for detection systems along borders.

Currently there are two Brillouin scattering configurations commercially available: (a) Brillouin backscattering ([2]) in which a single source of light is used as the probe, and (b) stimulated Brillouin ([26]) in which a pump laser light wave enters one end of the fiber and a counterwave probe enters the other end. The interaction between the pump and the probe signals maximizes the information available from the scattering, and hence increases significantly the accuracy of the strain estimate. The backscattering Brillouin configuration has a certain advantage over the stimulated approach in case a fiber breaks, as only one end of the fiber is required to obtain measurement.

There are two types of errors involved in the BOTDR readings. One is a random error, whereas the other is associated with the spatial resolution induced by the length of the light pulse inside the fiber. The random error of a typical BOTDR analyzer corresponds to a normal distribution with a standard deviation of $\sigma=15$ με (i.e. accuracy of 30 με) for backscattering Brillouin configuration (YOKOGAWA, 2010), and $\sigma=2$ με (i.e. accuracy of about 4 με) for stimulated Brillouin configuration ([26]). As this error is random, it may be reduced by averaging multiple readings, in which case a reduction factor of $1/\sqrt{n}$ (n is the number of readings) is achieved.

The other departure from the exact strain profile comes from the limit on spatial resolution. The BOTDR measures a weighted average of the strain over ~1 m, at points spaced by ~10 cm. This limit comes from the physical length of the pulse of light in the optical fiber, with the result that the BOTDR profile is the convolution of the true strain profile with the shape of the light pulse. As a result, for example, a localized disturbance such as a crack, will appear as a distributed profile, with a shape similar to the Gaussian bell curve.

Temperature changes influence the BOTDR strain reading and therefore temperature compensation is necessary. This can be achieved easily by obtaining a reading of an unstrained fiber. The Brillouin scattering is such that temperature changes lead to a linear shift in the Brillouin frequency, and, therefore, the arithmetic involved in the compensation is straightforward. Most telecommunication cables are made such that the inner glass core is protected from the outer shell by a lubricant or gel. Although this type of fiber is not suitable for strain measurements, they are ideal for temperature compensation because the inner fiber is not strained even when the outer coating is strained. Calculation wise, since changes in Brillouin shift are linear with strain and temperature changes (i.e. $\Delta v_B = c_\epsilon \Delta \epsilon_f + C_T \Delta T$, where $\mu_f$ is the longitudinal strain in the fiber and T is the temperature), a set of equations can be written to relate the behavior of two closely placed cables, which experience the same temperature and strain changes.

A solution for the strain and temperature can be obtained as:

$$\left\{ \begin{array}{c} \Delta \epsilon_f \\ \Delta T \end{array} \right\} = \frac{1}{\beta - \alpha} \begin{bmatrix} \frac{\beta}{c_\epsilon^{SF}} & -\frac{1}{c_\epsilon^{SF}} \\ -\frac{\alpha}{c_T^{SF}} & \frac{1}{c_T^{SF}} \end{bmatrix} \left\{ \begin{array}{c} \Delta v_B^{SF} \\ \Delta v_B^{LF} \end{array} \right\} \quad (2)$$

$$\alpha = \frac{c_\epsilon^{LF}}{c_\epsilon^{SF}}; \beta = \frac{c_T^{LF}}{c_T^{SF}}$$

where $\Delta v_B^{LF}$ is the change of Brillouin shift recorded in the lubricated cable, and $\Delta v_B^{SF}$ in the change of Brillouin shift recorded in the "strain sensor" fiber. $c_\epsilon^{SF}$, $c_T^{SF}$ are the coefficients of the "strain sensor" and $c_\epsilon^{LF}$, $c_T^{LF}$ are the coefficients of the lubricated cable. These coefficients can be easily determined by from a calibration setup where fibers are heated and strained.

For the cables used in the current research $c_\epsilon^{SF}$ and $c_\epsilon^{LF}$ were found to be equal to $5 \cdot 10^{-5}$ GHz/µε and $5 \cdot 10^{-7}$ GHz/µε, respectively. The temperature coefficients of the two fibers were practically identical and equal to $1 \cdot 10^{-3}$ GHz/° C.

The corresponding $\alpha$ and $\beta$ values are 0.01 and 1.0. This indicates that an independent measurement for temperature can be made using only a lubricated (gel) cable, without the need to solve Eq. 2 (as the contribution of the strain to $\Delta v_B^{LF}$ is negligible) For this case, of a $\alpha \cong 0$ and $\beta \cong 1$, $\Delta \epsilon_f = (\Delta v_B^{SF} - \Delta v_B^{LF})/c_\epsilon^{SF}$. Note, that if the temperature changes are ignored altogether (and only $\Delta v_B^{SF}$ is used to evaluate the strain), an error of 20 for each degree Celsius will be introduced into the evaluation of strain. The above compensation method was used in the experiments presented in later sections. Tunneling-induced displacements and strains in the fibers As the tunnel is being excavated, deformations, although small, develop in the soil. If the fiber, or the structure to which the fiber is attached, are infinitely flexible, they will "follow" the soil deformation as it would develop in a green field (a field where no fibers or structure exist). In this case the longitudinal strains in the fiber will be equal to that of the soil along the axis of the fiber $$\epsilon_f = \hat{n}^T E \hat{n} \quad (3)$$

$$E = \begin{bmatrix} \epsilon_{xx} & \epsilon_{xy} & \epsilon_{xz} \\ \epsilon_{yx} & \epsilon_{yy} & \epsilon_{yz} \\ \epsilon_{zx} & \epsilon_{zy} & \epsilon_{zz} \end{bmatrix} = \frac{1}{2}[\nabla u + (\nabla u)^T]$$

$$\nabla u = \begin{bmatrix} \frac{\partial u_x}{\partial x} & \frac{\partial u_x}{\partial y} & \frac{\partial u_x}{\partial z} \\ \frac{\partial u_y}{\partial x} & \frac{\partial u_y}{\partial y} & \frac{\partial u_y}{\partial z} \\ \frac{\partial u_z}{\partial x} & \frac{\partial u_z}{\partial y} & \frac{\partial u_z}{\partial z} \end{bmatrix}$$

where $\mu_f$ is the longitudinal strain in a fiber, $\hat{n}$ is a unit vector along the fiber, E is the strain matrix (tensor) of the soil, $u_i$ is the soil displacement in direction i (either x,y,z). For example, if the fiber is laid horizontally (as in option 1 in FIG. 1), $\hat{n}=[1,0,0]^T$ and $\epsilon_f = \epsilon_{xx}$, while if the fiber is positioned vertically (as in option 2 in FIG. 1), $\hat{n}=[0,0,1]^T$ and $\epsilon_f = \epsilon_{zz}$.

It is quite clear that in the second option, of fibers in mini-piles, the mini-piles would significantly affect the developed displacements, and consequently the developed strain in the fiber would be different than that of the green field. On the other hand, in the case of option 1, it is reasonable to assume that the low stiffness of the fiber does not significantly alter the green field displacement.

To avoid a priori assumptions regarding the interaction between the fiber and the soil, modeling of the soil-fiber interaction has been made. The analysis of the developed strains in the fiber is based on the following assumptions: (1) The fiber is always in contact with the soil or the mini-pile, (2) the soil (in the vicinity of the fibers) is homogenous linear elastic continuum, (3) the tunnel is unaffected by the existence of the fiber (i.e. unaware of soil-fiber interaction).

Generally, the second assumption is violated in soil mechanic problems. However, in this specific problem of small hand-dug tunnel it is more than reasonable, as the induced strain (near the surface) by the tunnels are very small so that the soil remains in its elastic range. The third assumption is also very reasonable as long as the tunnel is not very close to the fiber. It should be noted that those assumptions are violated only when the tunnel is very close to the fiber, in which case the tunnel can easily be detected regardless of the interaction model. Therefore the above assumptions do not constitute any limitation on the feasibility study.

In the case of an horizontally-placed shallow fiber, the fiber bending stiffness is negligible and hence only its longitudinal stiffness is considered. By discretisizing the fiber, a global stiffness matrix can be written for the fiber, which relates its displacement to the forces at the discretisized nodes:

$$f^f = S^f u^f \quad (4)$$

where $f^f$ is a vector representing the interaction forces acting on the fiber, $S^f$ is the global stiffness matrix of the fiber, and $u^f$ of is the longitudinal displacement of the fiber.

It is noted that in the formulation, boldface capitals represent matrices and boldface letters represent vectors. Subscripts are used to refer to individual elements in the matrices or vectors.

The soil continuum displacement can be evaluated using flexibility coefficients:

$$u^C = Gf^s \quad (5)$$

where $u^C$ is the soil continuum displacement, G is the flexibility matrix (the element $G_{ij}$ gives the displacement at point i due to unit loading at point j), and $f^s$ are the forces acting on the soil. In the simple case of a homogenous half space, $G_{ij}$ can be constructed analytically using Mindlin (1936) solution. Writing Eq. 5 for a given point along the fiber yields:

$$u_i^C = \sum_j G_{ij} f_j^s \quad (6)$$

This soil continuum displacement can be decomposed into two components: $u_i^{CL}$—the displacement at the point due to its own loading, and $u_i^{CA}$—the additional displacement of the point due to loading at different locations (say, at the points along the fiber or at the tunnel):

$$u_i^C = \overbrace{G_{ii} f_i^s}^{u_i^{CL}} + \overbrace{\sum_{\substack{j \\ j \neq i}} G_{ij} f_j^s}^{u_i^{CA}} \quad (7)$$

The additional displacement, $u_i^{CA}$, can be further decomposed into: $u_i^{CAF}$—the additional displacement caused by interaction forces at other locations along the fiber (at other locations than i), and $u_i^{CAT}$ the additional displacement due to the tunneling:

$$u_i^C = \overbrace{G_{ii} f_i^s}^{u_i^{CL}} + \overbrace{\sum_{\substack{j \\ j \neq i \\ j \neq tunnel}} G_{ij} f_j^s}^{u_i^{CAF}} + u_i^{CAT} \quad (8)$$

By utilizing assumption 3, that the tunnel is not affected by existence of the fiber, $u^{CAT}$ becomes the green field displacement, $u^{gf}$.

Note that the forces acting on the fiber are equal but opposite to the forces acting on the soil (reactions):

$$f_i^f = -f_i^s = -\frac{u_i^{CL}}{G_{ii}} \quad (9)$$

Due to compatibility, the fiber displacements, $u^f$, are equal to those of the soil continuum; that is $u^f = u^C = u^{CL} + u^{CAF} + u^{CAT}$. Introducing this with Eq. 9 to Eq. 4 results in:

$$S^f u^f = K^* u^{CAF} + K^* u^{CAT} - K^* u^f \quad (10)$$

where $K^*$ is a diagonal matrix, $K^*_{ij} = 1/G_{ij}$ for i=j and 0 for i≠j.

By multiplying the above equation by the inverse of $K^*$ and rearranging the terms we obtain:

$$(G^* S^f + I) u^f = u^{CAF} + u^{CAT} \quad (11)$$

where $G^*$ is also diagonal, $G^*_{ij} = G_{ij}$ for i=j and 0 for i≠j. Note that $$u^{CAF} = (G - G^*) f^s = -(G - G^*) S^f u^f.$$

Introducing this to Eq. 11 and rearranging the terms results in:

$$(GS^f + I) u^f = u^{CAT} \quad (12)$$

This set of linear equations can be solved to obtain the displacement at any point along the fiber. The strain in the fiber can be obtained by differentiating the displacement of the fiber.

It is noted that if the fiber is infinitely flexible its stiffness matrix is equal to zero, $S^f = [0]$, and its displacement, based on Eq. 12 is equal to the green field displacements.

With respect to the second option of vertical mini-piles, the fiber stiffness is extremely small compared to the stiffness of the mini-pile, and hence it must follow the mini-pile. However, the mini-pile itself does not follow the green field displacement and hence a solution for its behavior needs to be established. If the underground optic fiber is located in the center of the pile, it will only be affected by the axial behavior of the pile. Alternatively, strain profile can be averaged from any apposing sides of the mini-pile. Consequently for this case only the axial behavior of the mini-pile need to be resolved. It appears that Eq. 12 is also relevant for that case, except that the fiber stiffness matrix is replaced by the mini-pile stiffness matrix, $S^P$:

$$(GS^P + I) u^f = u^{CAT} \quad (13)$$

Again, this set of linear equations can be solved to obtain the strains on the neutral axis of the pile, and the underground optic fiber strains. Note that the G matrix for vertical piles would be different from the G matrix for horizontal fiber, as one is based on Mindlin's (1936) solution for vertical loads and the other for horizontal loads.

Using the third assumption that the tunnel is not affected by the fiber, the green field displacement can be adopted for $u^{CAT}$.

It should be noted that there is no restriction for the soil behavior to be linear elastic around the tunnel, and it may be plastic, as long as significant soil volume around the fiber is elastic.

Equations 12 and 13 give the displacement of the fiber for a given input of green field displacement. Currently there is no experimental data in the literature regarding the green field displacement generated by very small and deep hand-dug tunnels (e.g. tunnels with a diameter of 0.5 m and depth greater of 10 m). Therefore the analysis can be based on some analytical or empirical relations for the green field displacements.

Two different relations for tunneling induced green field displacements were used. One is empirical, based on correlation from a number of different tunneling cases (e.g. Mair et al. 1993), and the other is based on continuum mechanics solution (Verruijt and Booker, 1996).

Clearly, hand-dug tunnels might induce different displacements than those based on these relations. But the difference between these two suggested relationships is significant and it is reasonable to assume that they cover the range of behavior associated with small deep hand-dug tunnels, and hence dot not limit the conclusion of the feasibility study. Moreover, the significant difference between the models allows sensitivity evaluation against imperfect modeling, by calibrating the detection system using one model and testing it with the other model.

While the Veruijt and Booker's (1996) solution gives the deformation in all directions, Mair et al. (1993) solution gives only vertical settlements:

$$u_z = s_{max}(z) \cdot \exp\left(-\frac{1}{2}\left(\frac{x}{i(z)}\right)^2\right) \quad (14)$$

$$i(z) = 0.175z_t + 0.325(z_t - z)$$

where $s_{max}(z)$ is the maximum vertical settlement at depth z, x is the horizontal distance from the tunnel centerline, i(z) is the distance to the Gaussian settlement trough inflection point, and $z_t$ is the depth of the tunnel.

Figure 8:
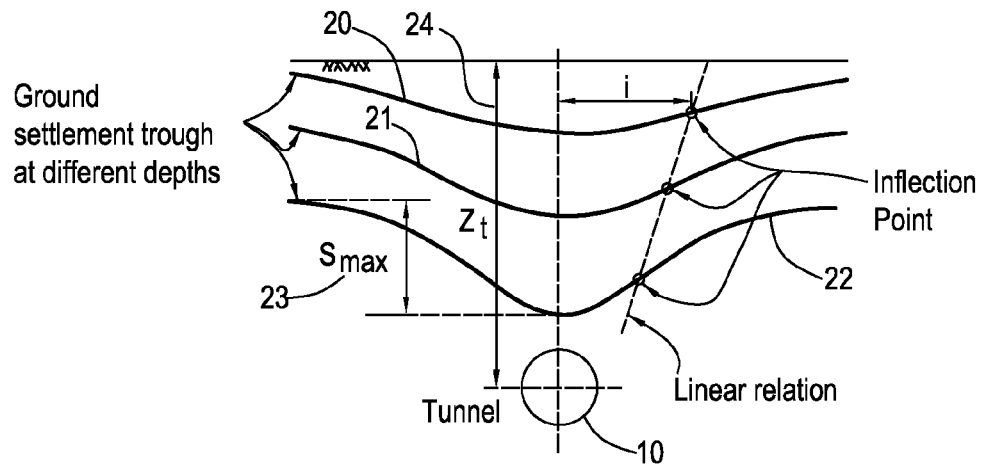
FIG. 8 illustrates an example of soil settlements resulting from an excavation of a tunnel.

The different parameters are illustrated in FIG. 8. FIG. 8 illustrates an underground optic fiber 10 (at a depth of Zt 24) and three different curves 20, 21 and 22 that illustrate the ground settlement as different depths of ground.

The Mair et al.'s displacement field may be completed if the relaxing assumption that the displacement vectors are directed towards the tunnel centerline is made (e.g. Attewell et al., 1986, Vorster et al., 2005). In this case, the horizontal displacements are:

$$u_x = \frac{x}{z - z_t} s_{max}(z) \cdot \exp\left(-\frac{1}{2}\left(\frac{x}{i(z)}\right)^2\right) \quad (15)$$

The volume loss, $V_L$, defined as the ratio of settlement volume to tunnel volume:

$$V_L = \frac{\int_{-\infty}^{\infty} u_z dx}{\pi \left(\frac{D_t}{2}\right)^2} \quad (16)$$

where $D_t$ is the diameter of the tunnel. The volume loss parameter reflects the quality of the tunneling process.

In underground construction, volume losses will typically be in the range of 1% (for very good tunneling process) to 5% (for poor tunneling process) (e.g. Mair and Taylor, 1997; Attewell et al., 1986).

In undrained soils, such as saturated clay, the volume loss ($V_L$) is constant with depth since the soil grains and the water are incompressible, and there is a unique relation between $s_{max}$, i and the $V_L$: $s_{max}(z)=0.313V_L D_t^2/i(z)$.

Calibration of such relationship was achieved by Mair et al. (1993) using field observations. In sandy soils, the problem is more complex, since the $V_L$ may not be constant with depth due shear induced contraction or dilation. However, recent centrifuge experiments (Marshall and Mair, 2008) showed that even in sands the $V_L$ near the surface increase with the tunnel $V_L$ up to a value of approximately 2% before dilation occurs.

The volume loss is one of the controlling parameters in the current feasibility study, and is a basic input parameter to both Mair et al. (1993) and Verruijt and Booker (1996) ground displacement models.

Figure 9:
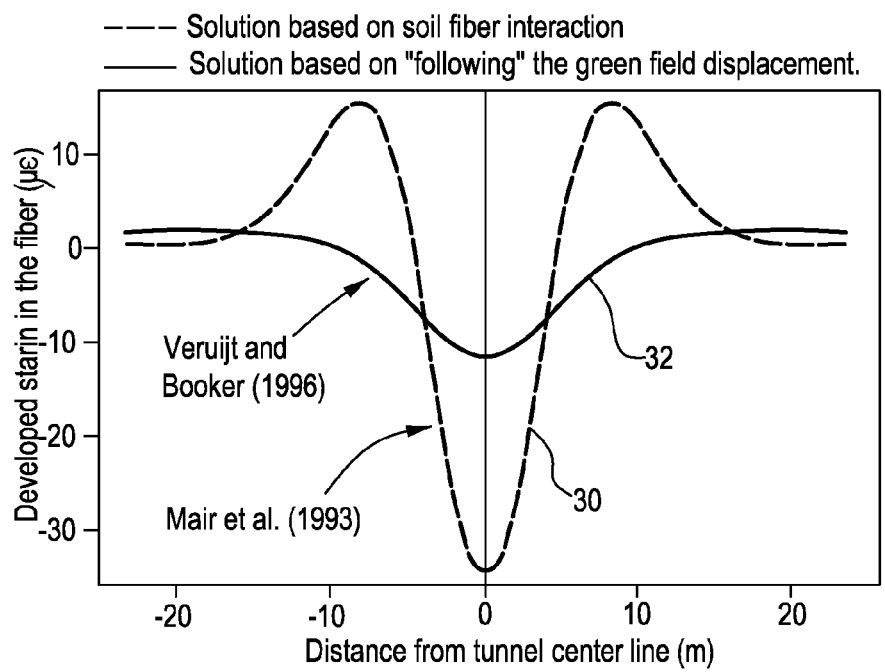
FIG. 9 illustrates two estimates of an impact of an excavation of an underground tunnel on a tension of a horizontal underground optic fiber, according to an embodiment of the invention.

FIG. 9 illustrates a solution for a specific case of a 0.5 m diameter tunnel at depth of 10 m and a volume loss of 2%. Curve 30 illustrates the relationship according to the model of Verruijt and Booker while curve 32 illustrates the relationship according to the model of Mair.

As can be seen a significant difference exist between the solution based on the empirical relation of Mair et al. (1993) and that based on Verruijt and Booker's (1996) elastic solution. It should be noted that the presented elastic solution is based on uniform contraction of the tunnel, and it is likely that the addition of an ovalization to its deformation will bring the two solutions closer.

In civil engineering projects, where tunneling induced displacement may cause damage to existing structure, a difference between prediction models is unfavorable, as it makes deterministic analysis problematic. However, in the current application of evaluating an automated detection system, the model should be as broad as possible, as this allows evaluation of system robustness against imperfect modeling.

As can be seen from FIG. 9, the results that take into account the interaction between the fiber and the soil (Eq. 12) are practically identical to the solution based on forcing the fiber to follow the soil. This indicates that the fiber is indeed very flexible compared with the soil (for which the Young's modulus, $E_s$, was assumed to be 20000 kPa (20000 kiloPascal) in the vicinity of the fiber). A difference of about 10% in the developed strain appears when the fiber stiffness (EA) is increased 100 fold.

The reinforced Fujikura fiber (for which the calculation was conducted) is already a very stiff fiber, and fibers 100 times stiffer do not exist. Consequently, it may be concluded that a horizontally laid fiber will follow the soil, regardless of its type.

The formulation above assumes that the fiber is attached to the ground, and there is no relative slippage, due to local failure, between the fiber and the soil. This assumption can be validated by evaluating the contact stress $\tau_c$:

$$\tau_c = \frac{EA}{S} \frac{\partial^2 u_f}{\partial x^2} = \frac{EA}{S} \frac{\partial \varepsilon_f}{\partial x} \quad (17)$$

where $u_f$ is the displacement of the fiber, and S is the perimeter of the fiber cross section. The values of $\tau_c$ for the presented cases are very small (<0.03 kPa), so that slippage is very unlikely. Only when the tunnel is very close to the fiber will slippage be an issue.

If a failure criterion of $\tau_f = \sigma_v \tan \delta$ is adopted (where $\sigma_v$ is the vertical stress at the fiber level, and $\delta$ is taken as 10°) slippage would occur (for the specific tunnel considered in the example) only if the tunnel is at depth smaller than about 3 m. In this case however, the strain would be significant (>400 με) and detection would not be an issue regardless of fiber slippage.

Figure 10:
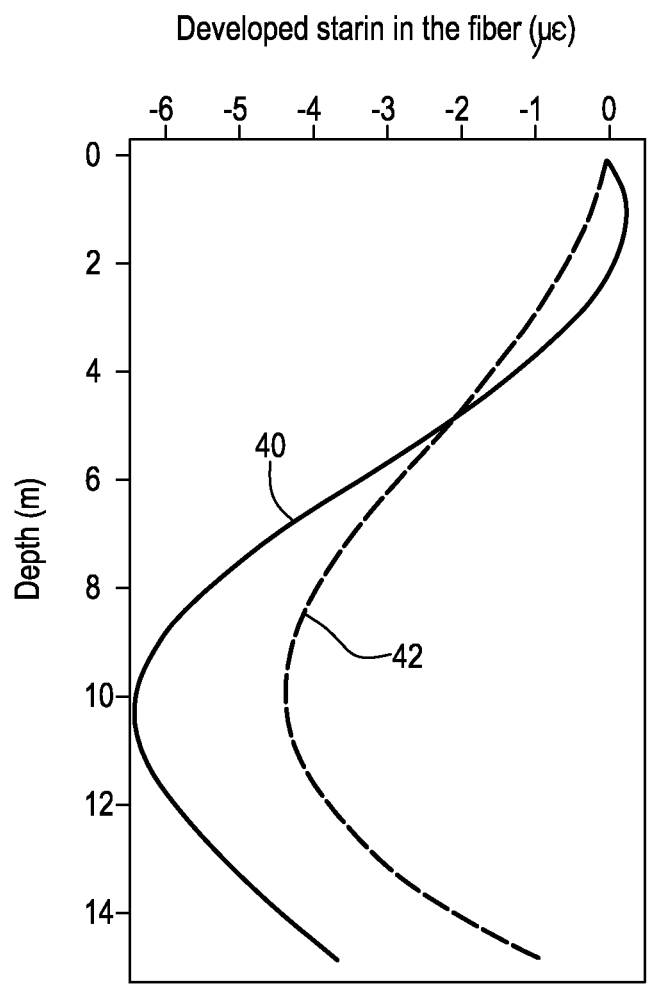
FIG. 10 illustrates an estimate of an impact of an excavation of an underground tunnel on a tension of a vertical underground optic fiber positioned in a rigid pile, according to an embodiment of the invention.

FIG. 10 shows an example solution for a vertical fiber in mini-piles. In this example 10 cm diameter concrete mini-piles are spaced at 20 m. It is assumed that the mini-piles are free at their head, and are not attached to an upper wall or beam which may resist displacement.

Curve 42 illustrates the relationship according to the model of Verruijt and Booker while curve 40 illustrates the relationship according to the model of Mair.

The solution is given only for ground displacement model of Verruijt and Booker (1996) since Mair et al.'s green field solution cannot be defined for points below tunnel level. The solution is given for the most severe case where the tunnel is located exactly between the mini-piles. Any other location would lead to greater strains in the fiber. As can be seen, there is a significant difference between the solution based on forcing the fiber to follow the soil and that which is based on pile-soil interaction.

The solutions presented in this section are "clean" from any noise or measurement errors. Those, however, must be included in the evaluation of an automated detection system.

Details on the incorporation of the noise and errors are given in the next section.

Simulated BOTDR Signals

Due to the high cost required to perform underground excavations, this feasibility study is performed mostly using simulated BOTDR signals derived from the relationships presented in the previous section. Due to BOTDR's limited spatial resolution, the BOTDR signal corresponding to a localized strain will be smeared. Loosely speaking, the BOTDR measures a weighted average of the strain over ~1 m, at points spaced by ~10 cm. This limited spatial resolution comes from the physical length of the pulse of light in the optical fiber. As a result, for example, a localized disturbance, such as a crack, will appear as a distributed profile, similar to a normal distribution. Mathematically, the weighted averaged strain is:

$$\varepsilon_A(x) = \int_{-\infty}^{\infty} \varepsilon_f(\tau)g(x-\tau)d\tau \quad (18)$$

$$g(x) = \frac{1}{\omega\sqrt{2\pi}}\exp\left(-\frac{x^2}{2\omega^2}\right)$$

where $\varepsilon_A(x)$ is the averaged strain obtained at point x along the fiber, $\mu_f(x)$ is the actual strain in the fiber, $\tau$ is the variable of integration, $g(x)$ is the weighing function, $\omega$ defines the width of the weighing function (i.e. the spatial resolution). Note that if $\varepsilon_f(x)=\delta(x)$ (delta function) then $\varepsilon_A(x)=g(x)$. In other words, the weighing function $g(x)$ can be determined experimentally by introducing a local disturbance in the fiber and recording the BOTDR signal. Results of such experiments were presented by Klar et al. (2006), where an $\omega$ value of 0.28 m was observed. In the current application the spatial resolution has little effect on the results, as the strain profile is very wide with a low gradient. Nonetheless, this aspect is considered in the simulations.

In addition to the spatial resolution, a random error is involved in the measurement. The simulated signal is therefore:

$$\varepsilon_S(x) = \varepsilon_A(x) + R[\sigma] \quad (19)$$

where $\varepsilon_s(x)$ is the simulated signal, and $R[\sigma]$ is a generator of pseudo-random numbers with a zero-mean normal distribution and a standard deviation $\sigma$. In the current study, a $\sigma$ of 2 $\mu\varepsilon$ was used (i.e. accuracy of 4 $\mu\varepsilon$), which corresponds to the typical error of the stimulated Brillouin configuration.

The models presented in the previous section were used to generate $\varepsilon_f(x)$ along the fiber, while Eqs. 18 and 19 were used to transform the expected strains into simulated BOTDR readings.

Surface Disturbance

In order for proposed system to be of practical interest, it should not only detect tunneling activities efficiently, but it should also yield few false alarms (false positive detections).

Since the depth of the horizontally-placed fiber is relatively shallow, the most probable causes for such false alarms are above-ground activities. The BOTDR signals of two such above-ground disturbances were recorded experimentally: surface loading of 100 to 400 kg, and wetting a 5 meter section of the soil.

Figure 11:
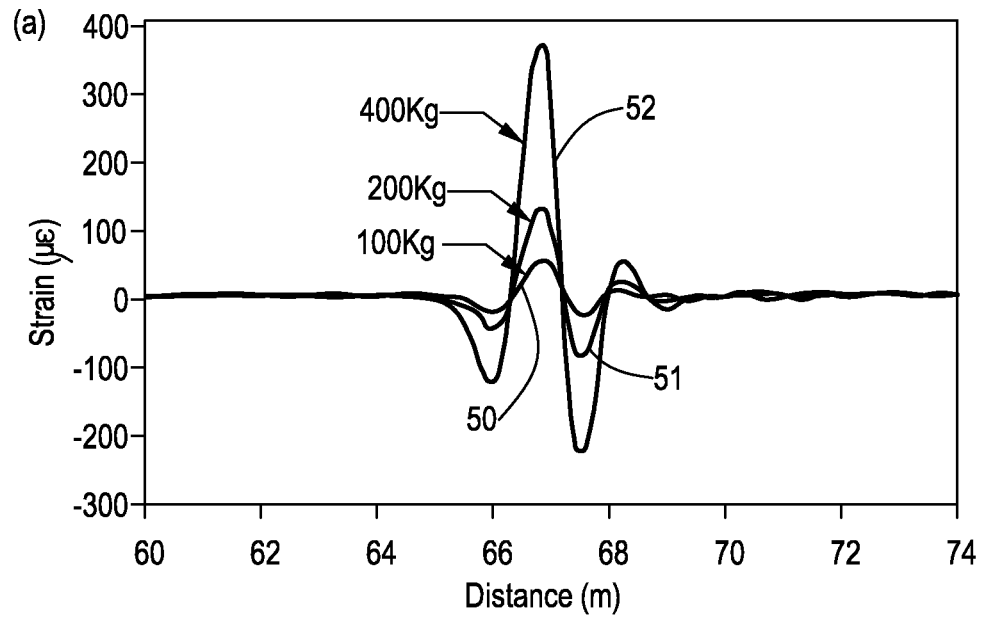
FIGS. 11 and 12 illustrate the strain developed over an underground optic fiber during a loading test and a wetting test, according to an embodiment of the invention.

Curves 50, 51 and 52 of FIG. 11 shows the strain profile recorded with loadings of 100 kg (curve 50), 200 kg (curve 51) and 400 kg (curve 52).

Figure 12:
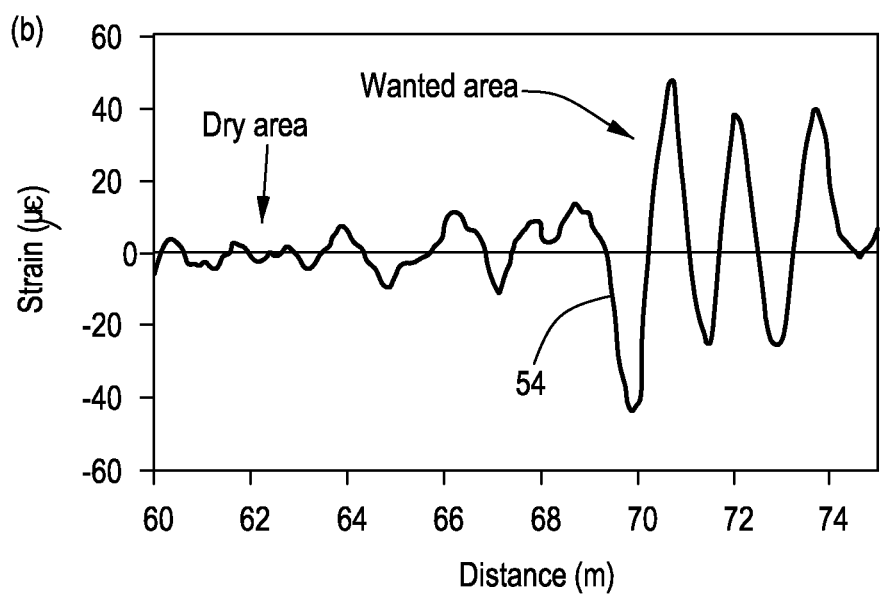

FIG. 12 shows the strain recorded as a result of the wetting. Curve 54 illustrates the changes of the strain as a function of the distance in a dry area (left had) and a wetted are (right hand). Those results are after temperature compensation using Eq. 2. Note that the strain profile in FIG. 11 is not fully symmetric, even though the fiber is strained symmetrically.

This is an outcome of slight imbalance in the Mach-Zehnder electro-optic modulator, which is involved in the stimulated BOTDR (Galindez and Thevenaz, 2008). In other words, the weighing function $g(x)$ of this specific analyzer is not fully symmetric. This has an apparent effect only when there is an abrupt change in the Brillouin frequency (i.e. only when there is an abrupt change in strain or temperature along the fiber, as in the localized loading case). The influence of this asymmetry on the performance of the proposed system was investigated and found to be marginal, since the tunneling induced stains are not localized.

The experimental signals, shown in FIGS. 11 and 12, were translated to random locations along the fiber and superimposed to the simulated BOTDR signals of the horizontally-placed fibers. Note that surface disturbances would have a minor impact on the strain profile in the mini-pile, at least at the greater depth for which it is intended, and therefore these disturbances were neglected altogether.

Post-Processing

As mentioned above, it is imperative for the system to identify tunneling activities while filtering out the signals due measurement noise and disturbances efficiently. In the present study, automated signal interpretation is achieved using wavelet decomposition of the BOTDR signal followed by a neural network. The main feature of wavelet decomposition is that the resulting coefficients contain information about both the location and shape (sharpness and amplitude) of the signal components (Walczak and Massart, 1997; Debnath, 2002). This is a key advantage of the distributed BOTDR measurement over other localized devices, as the shape of the signal plays a major role in distinguishing excavation activities from other surface activities.

While wavelet decomposition by itself does not produce a compressed representation of the original signal, most of the information of interest is typically contained in a few of the resulting wavelet coefficients. Several approaches for identifying these coefficients have been described in the literature, such as eliminating all "small" coefficients using either simple thresholding (Leung et al. 1998; Ehrentreich, 2002), mutual information (Alsberg et al., 1998) or genetic algorithms (Depczynski et al., 1999). In this study, the approach recommended by Trygg and Wold (1998), which consists of retaining the coefficients with the highest variance, is used: during the calibration phase, after applying the wavelet transformation to all the signals, the resulting coefficients are concatenated (row-wise), and the variance of the resulting matrix is calculated (column-wise). Some of these stages were illustrated in FIG. 7. The positions of columns with the largest variances are recorded and the corresponding coefficients are extracted and used as inputs to a neural network (Haykin, 1999). During the testing phase, after applying the wavelet decomposition to the signal, the same coefficients are extracted and inputted into the neural network.

The ability of the system to detect tunneling activities, while remaining mostly insensitive to measurement noise and above-ground disturbances, can be attributed to the wavelet decomposition ability to capture the wide patterns of strain profile associated with tunnels and distinguish between these patterns and those from localized random errors and other disturbances.

In the case of horizontally laid fiber, the neural network was trained to predict the ratio $\xi_h = V_L D_t^2 / Z_f$, which is a measure of the impact of the tunnel on the fiber. Other choices, such as training the neural network to predict a binary number (i.e. tunnel or no tunnel) or the ratio $V_L D_t^2/Z_t^2$ (to which the maximum horizontal strain at the surface is proportional in the two considered ground displacement models) were also considered, but resulted in poorer detection performances when imperfect modeling was considered (i.e. when the system was trained with one model and tested with a the other). As can be seen from FIG. 4, the effect of a tunnel is restricted up to approximately 20 m on either side of the tunnel. Based on this observation, it was decided to split the continuous BOTDR signal into segments of 25 m, and the process illustrated in FIG. 6 was applied separately to each and every segment. The wavelet decomposition was performed up to level 10 and the 15 coefficients with the highest variance were retained. The system was trained with 40,000 cases, and tested with 60,000 cases. The training and validation was conducted for tunnels at depth ranging from 10 to 40 m and volume loss from 0.1% to 2%.

In the case of a vertical fiber, the strain profile along each pile was processed, using the algorithm of FIG. 4 or 6, both to train and later test the automated system. In this case the neural network was trained to predict the ratio $\xi_v = V_L D_t^2 / x_t$, where $x_t$ is the distance of the tunnel from the considered mini-pile. 20,000 cases were used to train the system, and 20,000 different cases to test it. The considered mini-pile length was 40 m, and the distance of the tunnel up to 25 m (i.e. distance from mini-pile to mini-pile of up to 50 m).

The ability of the system to detect tunneling activities, while remaining mostly insensitive to measurement noise and above-ground disturbances, can be attributed to the wavelet decomposition ability to capture the wide patterns of strain profile associated with tunnels and distinguish between these patterns and those from localized random errors and other disturbances.

Results—Option 1 (FIG. 1)

Figure 13:
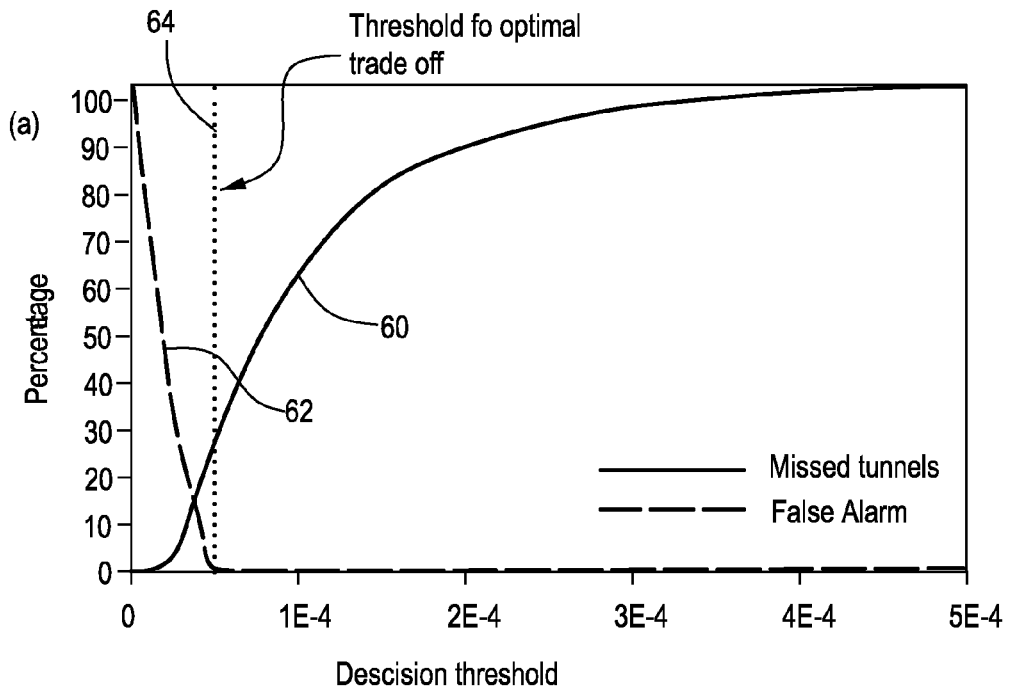

FIG. 13 shows the rate of detection and false alarms, as function of a decision threshold, for a system calibrated and tested with signals based on the Mair et al. (1993) soil displacement model. Curve 62 illustrates false alarm percentage per decision threshold and curve 60 illustrates the ratio between missed tunnels percentage and the decision threshold. FIG. 13 also illustrates an optimal decision threshold 64.

The classification whether a detection was correct or false, for a given threshold value can be made by a decision chart. $S^0$ represents the segment beneath which a tunnel exists, $S^{\pm 1}$ represents segments adjacent to $S^0$, and $S^{>\pm 1>}$ represents any segments farther away from $S^0$.

For each segment, the process of FIG. 6 was applied to the BOTDR signal, resulting with a neural network prediction for $\xi_h$.

According to the decision chart, if the neural network prediction, $\xi_h$, for $S^0$ is above the threshold value, $\xi_h^{th}$, a correct detection is declared, since the tunnel is positioned at that segment. If the neural network prediction is above $\xi_h^{th}$ in segment $S^{>\pm 1>}$ the detection is classified as false alarm, as the tunnel is located far away, and cannot be responsible for the high predicted $\xi_h$.

If, however, the neural network prediction is above the threshold value in a segment adjacent to a segment that contains a tunnel (i.e. $S^{\pm 1}$) it is not classified as a false alarm. This is because the tunnel can be located just beneath the edges of segment $S^0$, and may affect segment $S^{\pm 1}$ as well. In other words, if a simple threshold was to be applied to the neural network prediction in a straightforward manner, some tunnels would likely be detected twice (in the correct and adjacent segment) and the rate of tunnel detected would be overestimated.

The decision chart can have the following form:

| | Prediction of neural network in a given segment | | |
|---|---|---|---|
| Segment S0 (includes tunnel) | Above threshold | X | X |
| Adjacent segment S1 or S(−01) (no tunnel) | X | Above threshold | X |
| Distant Segment (distance from S0 is at least one segment) (no tunnel) | X | X | Above threshold |
| CLASSIFICATION | Correct detection − tunnel in S0 | No detection + no false alarm | False alarm in distant segment |

X—the value does not affect the classification.

As seen from FIG. 13 a threshold value of $5 \cdot 10^{-5}$ m (dashed line) appears to provide an optimal trade-off between the false alarm rate and the number of missed detections: approximately 25% of the tunnels are not detected and the false alarm rate is less than 1%.

Very similar results were obtained when the system was both trained and calibrated using the Verruijt and Booker (1996) ground displacement model. In order to study the sensitivity of the proposed system to imperfect modeling, two additional analyses were performed in which distinct models were used for calibration and testing stages: calibration using the Mair et al. (1993) ground displacement model and testing using Verruijt and Booker (1996) model, and vice versa.

Figure 14:
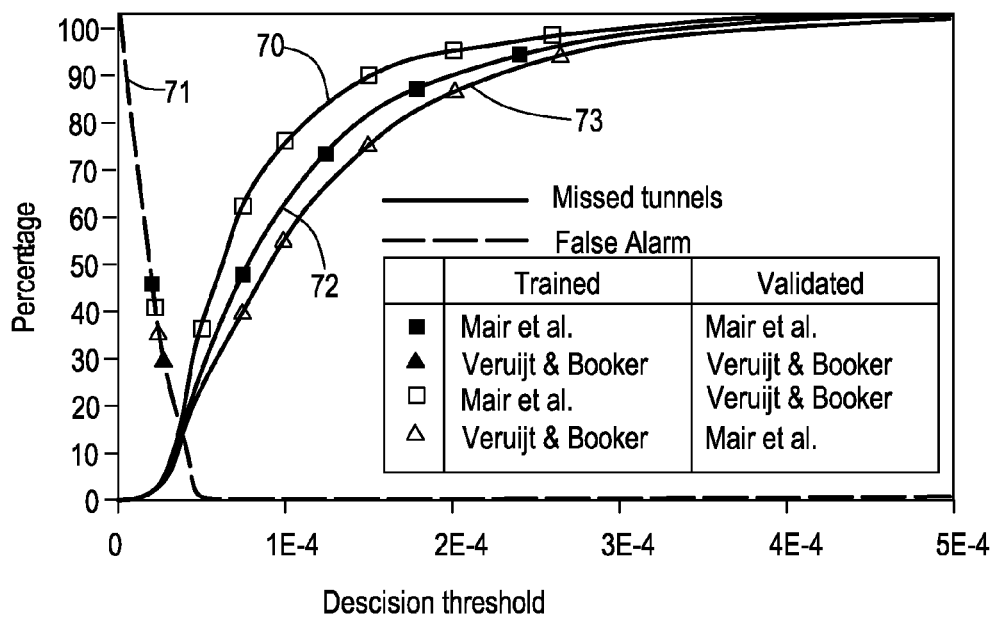

The results of all combinations are shown in FIG. 14, where it appears that the optimal threshold value retain the value of $\xi_h^{th} = 5 \cdot 10^{-5}$ m. It can be seen that the mismatch between the models used at the calibration and validation stages has limited impact on the detection performances, with an increase of missed tunnels from 25% to 35% (for $\xi_h^{th} = 5 \cdot 10^{-5}$ m) when the system is trained with ground displacement model of Mair et al. (1993) and tested with that of Verruijt and Booker (1996).

This figure illustrates false alarms and tunnel detection rates per decision threshold for various training and validation models, as illustrate din the following table:

| Curve | Training model | Validation model |
|---|---|---|
| 71 | Mair et al. | Mair et al. |
| 72 | Verruijt and Booker | Mair et al. |
| 73 | Mair et al. | Verruijt and Booker |
| 74 | Verruijt and Booker | Verruijt and Booker |

These results indicate that any "real" detection system would have to be calibrated using signals generated with a model that would of course be imperfect. The present results show that model imperfection should not diminish the performance of the system drastically.

Figure 15:
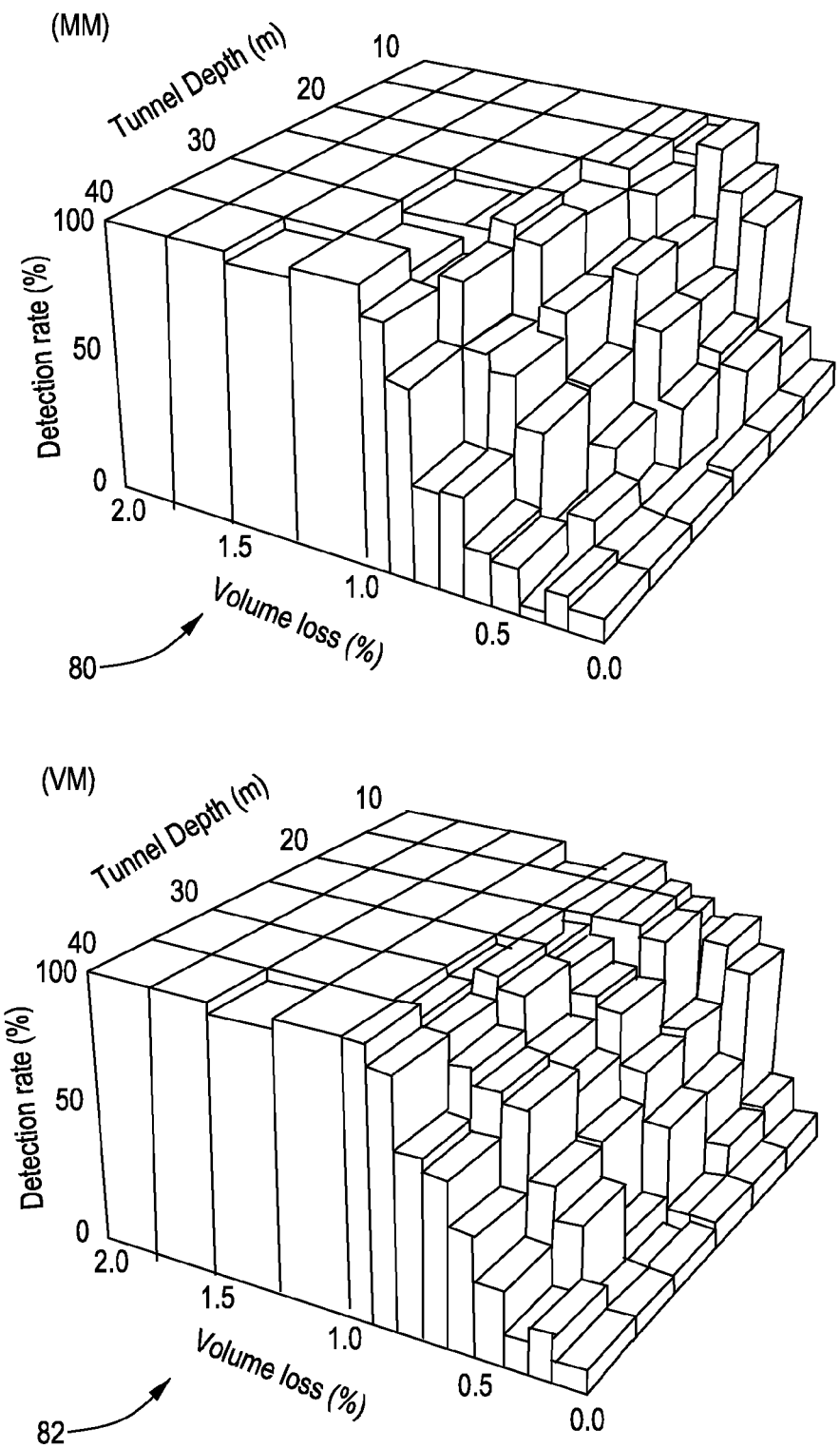
Figure 16:
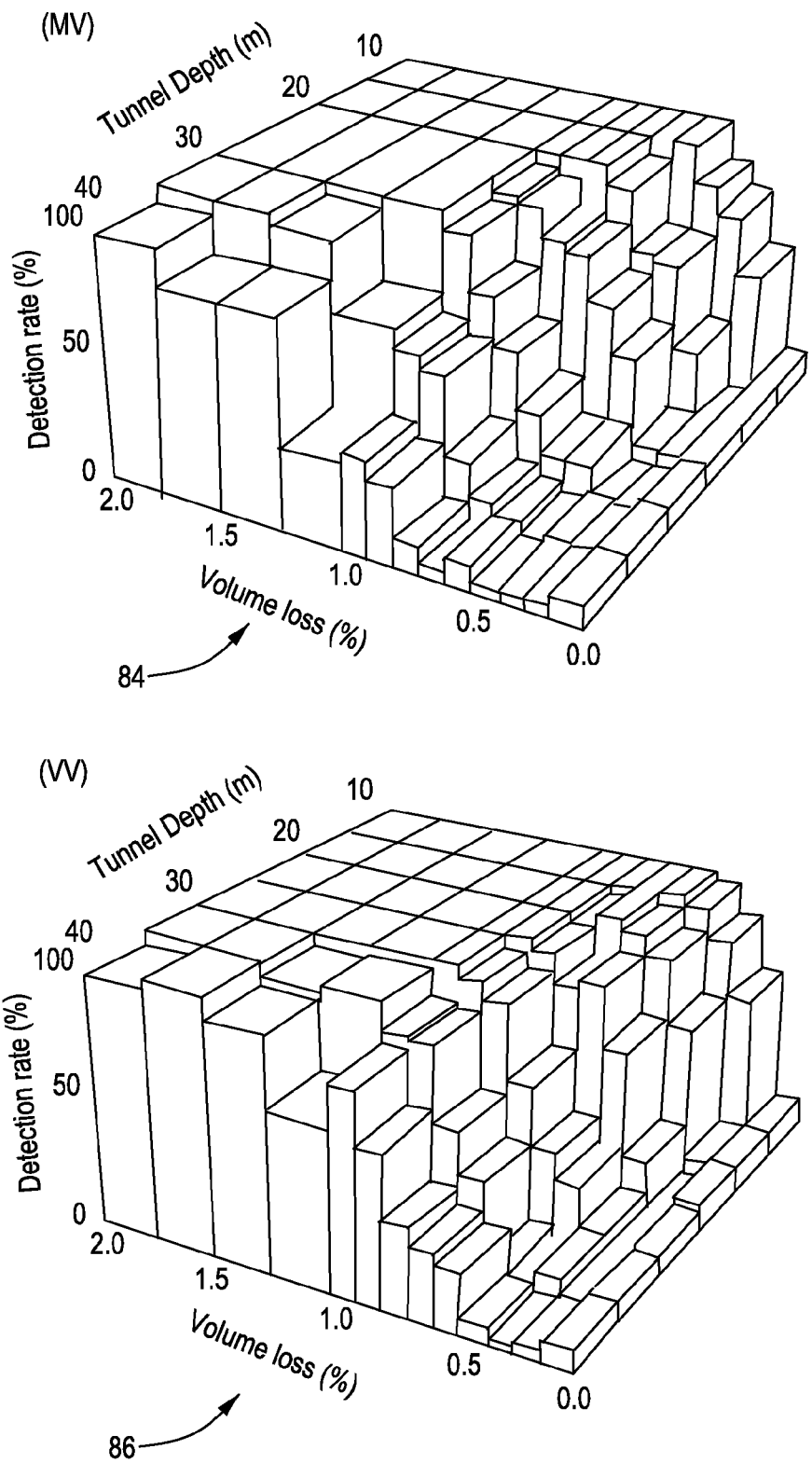

The histograms of FIGS. 15 and 16 illustrate the performance of the system, as function of tunnel depth and volume loss, for a very small tunnel of $D_t = 0.5$ m, when the optimal threshold value, $\xi_h^{th} = 5 \cdot 10^{-5}$ m, is used. A random population of 2100 tunnels was used for each of the histograms shown in FIGS. 15 and 16.

| Histogram | Training model | Validation model |
|---|---|---|
| 80 | Mair et al. | Mair et al. |
| 82 | Verruijt and Booker | Mair et al. |
| 84 | Mair et al. | Verruijt and Booker |
| 86 | Verruijt and Booker | Verruijt and Booker |

The results of FIGS. 15 and 16 correspond to the full range of depth and volume loss investigated. In general, there would be some relation between soil properties, depth, and the expected volume loss. For example, the model of Macklin (1999) which relates volume loss to the load factor, defined as the ratio between the stability numbers, may be used. In the present case, of supposedly free surface and free tunnel, the Macklin (1999) expression degenerates into:

$$VL(\%) = 0.23\exp\left(4.4\frac{\gamma z}{s_u N_c}\right) \quad (20)$$

where $\gamma$ is the unit weight of the soil, $s_u$ is the undrained shear strength of the soil, and $N_c$ is the critical stability ratio. The literature does not contain stability numbers of small deep tunnel (i.e. of large normalized cover depth, C/D). Therefore it was necessary to calculate the relevant values of $N_c$. The method of Klar et al. (2007) was used for obtaining an upper bound value for $N_c$ when Eq. 20 was evaluated). Note that the use of upper bound values will result in underestimation of volume loss from Eq. 20, and hence may be considered conservative for the current application (i.e. will minimize the estimate of detection rate).

Figure 18:
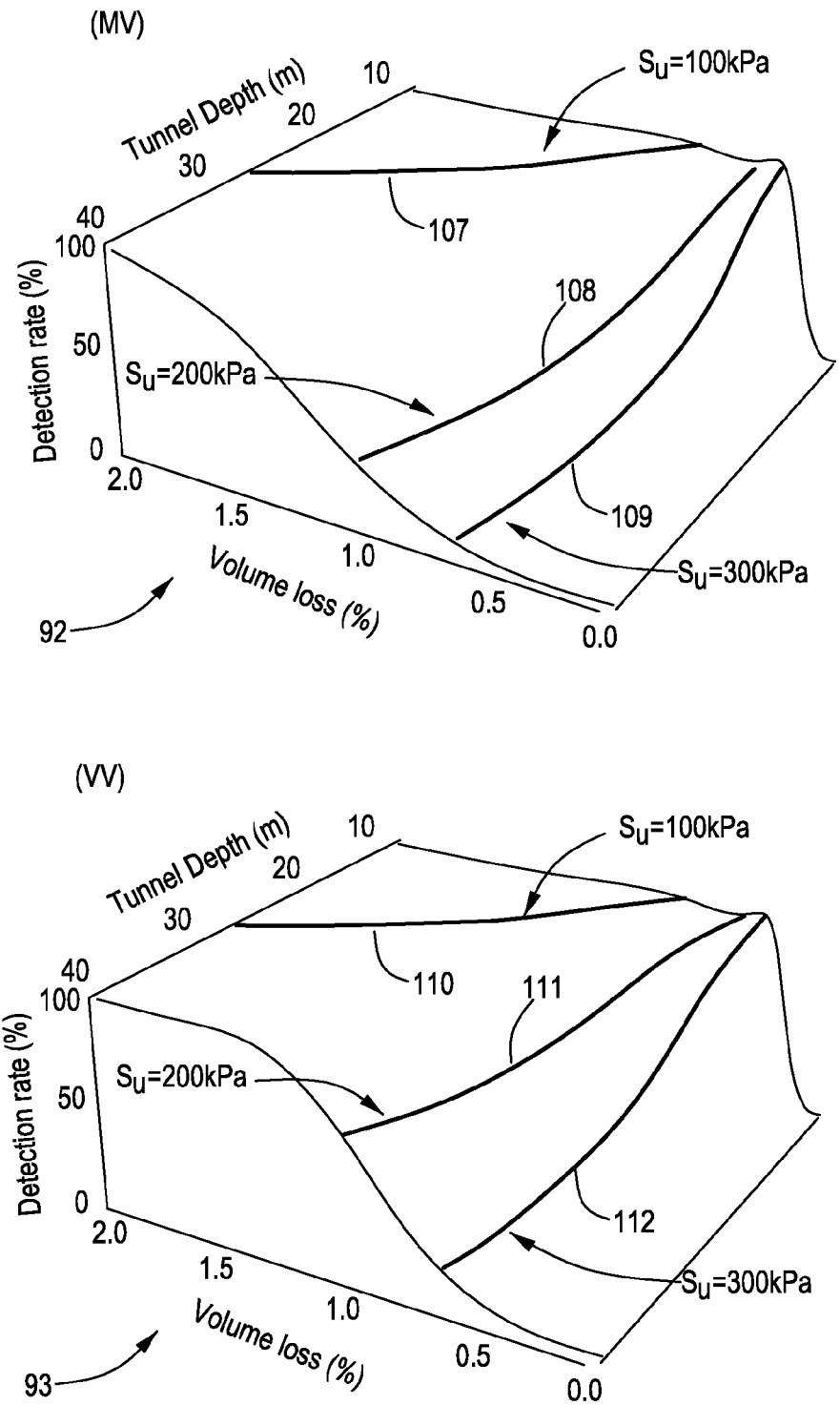

FIGS. 17 and 18 show relationships between detection rate, tunnel depth and volume loss of the tunnel for various scenarios.

| Graph | Training model | Validation model |
|---|---|---|
| 90 | Mair et al. | Mair et al. |
| 91 | Verruijt and Booker | Mair et al. |
| 92 | Mair et al. | Verruijt and Booker |
| 93 | Verruijt and Booker | Verruijt and Booker |

Curves 101, 102 and 103 of graph 90 illustrate the relationships between detection rate, volume loss and tunnel depth for loads of Su=100 kPa, Su=200 kPa and Su=300 kPa, accordingly.

Curves 104, 105 and 106 of graph 91 illustrate the relationships between detection rate, volume loss and tunnel depth for loads of Su=100 kPa, Su=200 kPa and Su=300 kPa, accordingly.

Curves 107, 108 and 109 of graph 92 illustrate the relationships between detection rate, volume loss and tunnel depth for loads of Su=100 kPa, Su=200 kPa and Su=300 kPa, accordingly.

Curves 110, 111 and 112 of graph 93 illustrate the relationships between detection rate, volume loss and tunnel depth for loads of Su=100 kPa, Su=200 kPa and Su=300 kPa, accordingly.

These graphs may be calculated using a continuous function of the form $1-\exp(-\alpha V_L^c/z_f^b)$ and the solutions lines based on Eqs. 19 for different undrained shear strength of the soil.

As can be seen, the detection rate decreases with increase of soil strength. Loosely speaking, the shear strength would generally increase with depth, but for normally consolidated clays its value would be smaller than 100 kPa in the range considered (up to 40 m). Clays with over consolidation ratio of about 3-4 will results in values smaller than 300 kPa in the depth range considered (calculations made using the strength relation of Chandler, 1998).

As can be seen, the detection rate may reduce significantly with depth if the volume loss is small (less than 1%). For this case, the alternative option of a vertical fiber embedded in a mini-pile may be used as shown in the following section.

Results—Second Option

As mentioned above, for the case of a vertical fiber only the Verruijt and Booker (1996) ground displacement model was used, as Mair et al.'s (1993) expression cannot be used to evaluate soil displacements at points below tunnel level. Remember, the Verruijt and Booker model is only used as an input to the pile-ground interaction model (Eq. 13), which changes the green field strains. The analysis is conducted with a 10 cm diameter 40 m long concrete mini-piles, positioned in a soil with Young's modulus of 50 MPa.

Figure 19:
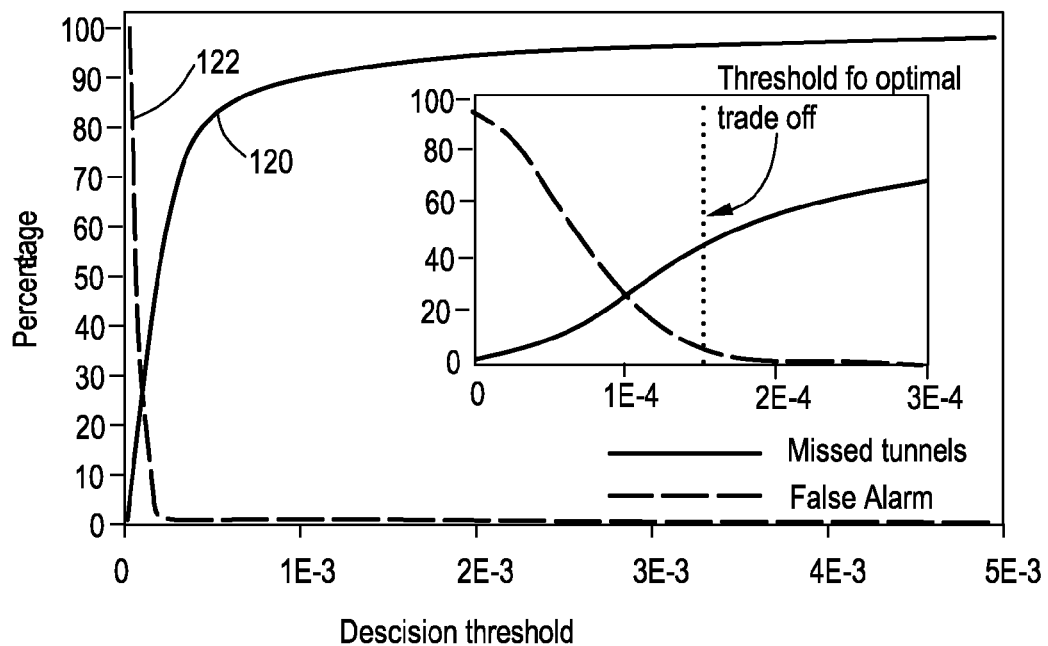

Curves 120 and 122 of FIG. 19 shows the performance of the system, as a function of the threshold value $\xi_v^{th}=V_L D_t^2/x_f$. The optimal threshold value appears to be $1.5 \cdot 10^{-4}$ m, for which the system has about 5% false alarms and about 60% detection rate.

Figure 20:
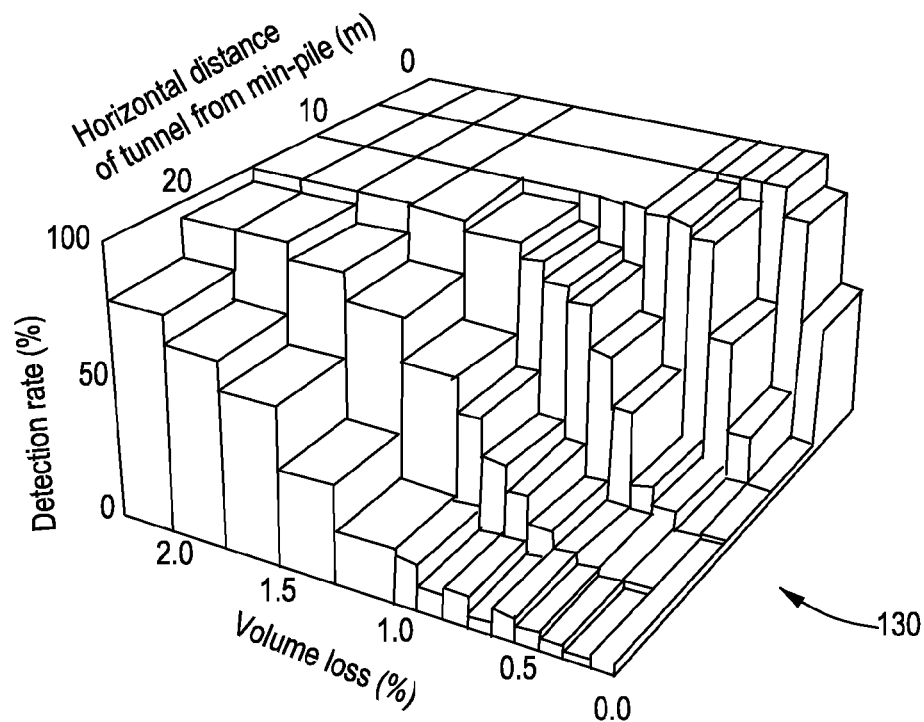

Graph 130 of FIG. 20 shows the performance of the system under the optimal threshold value $\xi_v^{th}=1.5 \cdot 10^{-4}$ m. As can be seen, a very high detection rate, of more than 93% is obtained when the distance between the mini-piles is 20 m or less (i.e. maximum distance between tunnel and mini-pile of 10 m) and when volume loss is at least 0.5%. This detection rate was found to be insensitive to the depth of the tunnel, as long as the tunnel level was above the tip of the pile. For comparison, the horizontally-laid fiber yielded such a detection rate only when the tunnel depth is less than 15 m (FIGS. 15 and 16). It should be noted that in some cases the signal itself is very low, in the order of magnitude of the random error, yet detection is possible. This is due to the fact that the random errors and the tunnel induced strains are reflected on completely different levels of the wavelet decomposition (one induces changes every 10 cm, and the other spreads over more than 10 m), and hence these signals are effectively decoupled.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method of detecting excavation of an underground tunnel, the method comprising: propagating a light pulse through an optic fiber that comprises (a) multiple underground optic fiber segments that are located in underground piles that are spaced apart from each other and (b) at least one optic fiber segment that is coupled to the multiple underground optic fiber segments; generating detection signals responsive to Brillion scattered light resulting from the propagating of the light pulse through the optic fiber; wherein the detection signals represent tension values at multiple locations along the optic fiber; and processing the detection signals to detect the excavation of the underground tunnel.

2. The method according to claim 1, comprising: propagating another light pulse through an unstrained underground optic fiber; generating other detection signals responsive to Brillion scattered light resulting from the propagating of the other light pulse through the unstrained underground optic fiber; wherein the other detection signals represent tension values at multiple locations along the other underground optic fiber; processing the other detection signals and the detection signals to provide a temperature compensated estimation of a presence of the underground tunnel.

3. The method according to claim 1, comprising: propagating multiple light pulses through the optic fiber wherein at each given point of time up to a single light pulse propagates through the optic fiber; generating sets of detection signals, each set of detection signal is responsive to Brillion scattered light resulting from the propagating of a single light pulse, out of the multiple light pulses, through the optic fiber; and processing the detection signals to detect excavation of the underground tunnel.

4. The method according to claim 1 wherein the at least one optic fiber segment that is coupled to the multiple underground optic fiber is positioned above a ground.

5. The method according to claim 3, wherein the processing comprises: applying a wavelet transformation on the sets of detection signals to provide sets of wavelet coefficients; calculating a variance of each group of wavelet coefficient; wherein a group of wavelet coefficients comprises wavelet coefficients that belong to different sets of wavelet coefficients but share a same location in each set of wavelet coefficients.

6. The method according to claim 1 wherein the processing comprises resolving axial behaviors of the underground piles.

7. The method according to claim 5, comprising: selecting selected groups of wavelet coefficients having largest variance values; providing the selected wavelet coefficients to a neural network trained to predict an impact of the underground tunnel on the underground optic fiber; and determining an excavation of the underground tunnel based on the selected groups of wavelet coefficients and on the impact of the underground tunnel on the optic fiber.

8. The method according to claim 3, comprising: applying a wavelet transformation on the sets of detection signals to provide sets of wavelet coefficients; providing at least a portion of the sets of wavelet coefficients to a neural network trained to predict an impact of the underground tunnel on the optic fiber; and determining an excavation of the underground tunnel, by the neural network.

9. The method according to claim 8, comprising predicting the impact of the underground tunnel on the optic fiber by calculating a ratio $V*D*D/z$; wherein V is a volume loss rate of ground resulting from the excavation of the underground tunnel, D is a diameter of the underground tunnel and z is a distance between the underground tunnel and the optic fiber.

10. The method according to claim 9, comprising determining that an underground tunnel exists if the ratio $V*D*D/z$ is above a threshold value of 0.00015.

11. The method according to claim 9, comprising training the neural network with sets of wavelet coefficients, each set of wavelet coefficient is associated with a V value, a D value and a z value.

12. The method according to claim 9, comprising training the neural network with sets of wavelet coefficients; wherein at least one set of wavelet coefficients is generated by simulation.

13. The method according to claim 9, comprising training the neural network with sets of wavelet coefficients; wherein at least two sets of wavelet coefficients differ from each other by a segment of underground optic fiber associated with the sets of wavelet coefficients.

14. The method according to claim 8, comprising predicting the impact of the underground tunnel on the optic fiber by a neural network while applying multiple models that differ from each other, each model models the impact of the underground tunnel on the underground optic fiber.

15. The method according to claim 1, comprising ignoring an event that alters a tension of the optic fiber over a distance that is shorter than a predefined threshold.

16. The method according to claim 1, wherein the at least one optic fiber segment that is coupled to the multiple underground optic fiber is underground and substantially parallel to a surface of a ground.

17. The method according to claim 1, comprising: propagating light pulses through multiple optic fibers while using time division multiplexing or frequency division multiplexing so that a pulse of light is sent over one optic fibers in a manner that does not interfere with a transmission and a reception of signals over another optic fiber; generating detection signals responsive to Brillion scattered light resulting from the propagating of the light pulses through the optic fibers; wherein the detection signals represent tension values at multiple locations along the optic fibers; and processing the detection signals to detect excavation of the underground tunnel.

18. The method according to claim 1, comprising propagating the light pulse through the optic fiber while maintaining heads of the underground piles free.

19. The method according to claim 1, comprising processing the detection signals to detect excavation of the underground tunnel, wherein a diameter of the underground tunnel does not exceed 0.5 meter.

20. A method for detecting excavation of an underground tunnel, the method comprising: receiving detection signals generated by a detector, the detection signals are responsive to Brillion scattered light resulting from propagation of multiple light pulses through an optic fiber; wherein the detection signals represent tension values at multiple locations along the optic fiber at different points of time; applying a wavelet transformation on the detection signals to provide wavelet coefficients; selecting a sub-set of wavelet coefficients; processing the selected wavelet coefficients to detect excavation of the underground tunnel and ignoring an event that alters a tension of the optic fiber over a distance that is shorter than a predefined threshold.

21. A non-transitory computer readable medium that stores instructions for: receiving detection signals generated by a detector, the detection signals are responsive to Brillion scattered light resulting from propagation of multiple light pulses through an optic fiber that comprises (a) multiple underground optic fiber segments that are located in underground piles that are spaced apart from each other and (b) optic fiber segments that are coupled to the multiple underground optic fiber segments; wherein the detection signals represent tension values at multiple locations along the optic fiber at different points of time; applying a wavelet transformation on the detection signals to provide wavelet coefficients; selecting a sub-set of wavelet coefficients; and processing the selected wavelet coefficients to detect excavation of the underground tunnel.

22. The non-transitory computer readable medium according to claim 21 that stores instructions for ignoring an event that alters a tension of the optic fiber over a distance that is shorter than a predefined threshold.

23. The method according to claim 20 wherein the detection signals are responsive to Brillion scattered light resulting from propagating light pulses through multiple optic fibers while using time division multiplexing or frequency division multiplexing so that a pulse of light is sent over one optic fibers in a manner that does not interfere with a transmission and a reception of signals over another optic fiber.

* * * * *